US012260505B2

(12) United States Patent
Jung et al.

(10) Patent No.: US 12,260,505 B2
(45) Date of Patent: Mar. 25, 2025

(54) METHOD AND DEVICE FOR PROVIDING AUGMENTED CONTENT THROUGH AUGMENTED REALITY VIEW ON BASIS OF PRESET UNIT SPACE

(71) Applicant: NAVER CORPORATION, Seongnam-si (KR)

(72) Inventors: Jeanie Jung, Seongnam-si (KR); Sangwook Kim, Seongnam-si (KR); Kihyun Yu, Seongnam-si (KR); Yeowon Yoon, Seongnam-si (KR)

(73) Assignee: NAVER Corporation, Gyeonggi-do (KR)

( * ) Notice: Subject to any disclaimer, the term of this patent is extended or adjusted under 35 U.S.C. 154(b) by 0 days.

(21) Appl. No.: 18/754,932

(22) Filed: Jun. 26, 2024

(65) Prior Publication Data

US 2024/0346785 A1    Oct. 17, 2024

Related U.S. Application Data

(63) Continuation of application No. PCT/KR2023/000235, filed on Jan. 5, 2023.

(30) Foreign Application Priority Data

Jan. 13, 2022   (KR) .......................... 10-2022-0005075

(51) Int. Cl.
*G06T 19/00*          (2011.01)
(52) U.S. Cl.
CPC ................................. *G06T 19/006* (2013.01)

(58) Field of Classification Search
None
See application file for complete search history.

(56) References Cited

U.S. PATENT DOCUMENTS

| 9,978,109 | B1 * | 5/2018 | Catalano | G06Q 50/16 |
| 10,777,010 | B1 * | 9/2020 | Patel | G06T 15/50 |
| 2010/0066559 | A1 * | 3/2010 | Judelson | G08B 25/14 |
| | | | | 358/448 |

(Continued)

FOREIGN PATENT DOCUMENTS

| KR | 10-1099137 B1 | 8/2011 |
| KR | 10-2012-0072124 A | 7/2012 |

(Continued)

OTHER PUBLICATIONS

PCmag, "Google Maps Tips 15: How to Access Indoor Maps", Feb. 19, 2015, URL: https://www.youtube.com/watch?v=a0c-xdM7vyA (Year: 2015).*

(Continued)

*Primary Examiner* — David H Chu
(74) *Attorney, Agent, or Firm* — Harness, Dickey & Pierce, P.L.C.

(57) ABSTRACT

Provided is a method for providing augmented content, wherein whether a user terminal is located in a preset unit space is determined on the basis of the location of the user terminal, and if the user terminal is determined to be located in the unit space, an image captured by a camera is displayed through an augmented reality (AR) view by being augmented with content associated with the unit space.

18 Claims, 15 Drawing Sheets

(56) References Cited

U.S. PATENT DOCUMENTS

| | | | | |
|---|---|---|---|---|
| 2011/0141141 A1* | 6/2011 | Kankainen | ............. | H04N 5/272 |
| | | | | 348/E7.001 |
| 2011/0161855 A1* | 6/2011 | Prehofer | ........... | H04M 1/72457 |
| | | | | 715/771 |
| 2013/0016123 A1* | 1/2013 | Skarulis | ................ | G06F 3/147 |
| | | | | 345/633 |
| 2013/0328930 A1* | 12/2013 | Lee | ....................... | G06T 19/006 |
| | | | | 345/633 |
| 2014/0063542 A1* | 3/2014 | Aoki | ................. | H04N 1/32539 |
| | | | | 358/1.15 |
| 2014/0267717 A1* | 9/2014 | Pitzer | .................. | G01C 15/002 |
| | | | | 703/1 |
| 2015/0091942 A1* | 4/2015 | Ko | ....................... | G06T 19/006 |
| | | | | 345/633 |
| 2015/0193982 A1* | 7/2015 | Mihelich | .............. | H04W 4/026 |
| | | | | 345/633 |
| 2015/0317829 A1* | 11/2015 | Carter | ...................... | G06T 7/74 |
| | | | | 345/633 |
| 2016/0005229 A1* | 1/2016 | Lee | ........................ | G06T 11/60 |
| | | | | 345/419 |
| 2018/0315248 A1* | 11/2018 | Bastov | ................. | G06T 19/006 |
| 2018/0349703 A1* | 12/2018 | Rathod | ................. | A63F 13/65 |
| 2018/0351758 A1* | 12/2018 | Becker | .................. | G05B 15/02 |
| 2018/0375823 A1* | 12/2018 | Nalukurthy | ......... | H04L 61/5046 |
| 2019/0212151 A1* | 7/2019 | Parker | ..................... | G06F 9/453 |
| 2020/0304690 A1* | 9/2020 | Zweigle | ................ | H04N 25/48 |
| 2020/0312029 A1* | 10/2020 | Heinen | ................... | G06T 17/20 |
| 2021/0117071 A1* | 4/2021 | Gharpuray | .......... | G06F 3/04815 |
| 2021/0231440 A1* | 7/2021 | Jadhav | ................... | G06V 20/20 |
| 2021/0231455 A1* | 7/2021 | Nguyen | ............. | G01C 21/3811 |
| 2021/0248283 A1* | 8/2021 | Kincart | ................... | G06T 17/05 |
| 2021/0248674 A1* | 8/2021 | Ogunbunmi | ........... | G06T 11/60 |
| 2021/0390640 A1* | 12/2021 | Kim | ...................... | G06T 19/006 |
| 2022/0050936 A1* | 2/2022 | Kincart | ................ | G06Q 30/0282 |
| 2022/0122331 A1* | 4/2022 | Liu | ....................... | G06T 19/006 |
| 2022/0189075 A1* | 6/2022 | Lynch | .................... | G06T 11/00 |
| 2022/0229947 A1* | 7/2022 | Santarone | ............... | G06F 30/27 |
| 2022/0318441 A1* | 10/2022 | Jagannathan | ......... | G06V 10/60 |

FOREIGN PATENT DOCUMENTS

| | | |
|---|---|---|
| KR | 10-2014-0065963 A | 5/2014 |
| KR | 10-2018-0058348 A | 6/2018 |
| KR | 10-1867020 B1 | 7/2018 |
| KR | 10-1983852 B1 | 5/2019 |

OTHER PUBLICATIONS

International Search Report dated Apr. 14, 2023 issued in PCT Patent Application No. PCT/KR2023/000235.
Written Decision on Registration for Korean Patent Application No. 10-2022-0005075 dated Feb. 27, 2024.
Korean Office Action for Korean Patent Application No. KR 10-2022-0005075 dated Jul. 31, 2023.

\* cited by examiner

METHOD AND DEVICE FOR PROVIDING AUGMENTED CONTENT THROUGH AUGMENTED REALITY VIEW ON BASIS OF PRESET UNIT SPACE

CROSS-REFERENCE TO RELATED APPLICATIONS

This application is a continuation of, and claims the benefit of priority under 35 U.S.C. §§ 120 and 365 (c) from PCT International Application No. PCT/KR2023/000235, which has an international filing date of Jan. 5, 2023 and claims priority to Korean Application No. 10-2022-0005075, filed Jan. 13, 2022, the entire contents of each of which are hereby incorporated by reference.

BACKGROUND

Technical Field

The following description relates to methods and devices for augmenting and thereby providing content or contents item in an image using an augmented reality (AR) view and, more particularly, to methods and devices for augmenting and thereby providing content associated with a corresponding unit space in an image of an AR view based on a preset unit space.

Related Art

Augmented reality (AR) refers to technology that converges and supplements virtual objects and information created with computer technology in the real world. That is, AR refers to technology for augmenting and thereby displaying virtual content in a real environment and a user may view the augmented content corresponding to the real environment through an electronic device.

Through a user terminal that is an electronic device of a user, content associated with an object present within a predetermined distance or a predetermined radius based on a location of the user terminal may be augmented in an image of the user terminal and thereby provided. When augmented content is provided only based on a physical distance from the user terminal as above, an unnecessarily large number of contents are augmented, which may increase cognitive load of the user and load of the user terminal. Also, content unsuitable for a service intended by the user may be inappropriately augmented on the user terminal.

As technology related to various services using AR technology, an AR navigator that is installed in a vehicle, displays an image of a driving path captured by a camera on a display, and maps and displays virtual display information of guiding the driving path on the image displayed on the display.

The aforementioned information is to simply help understanding and may include content that does not form a part of the related art and may not include what the related art may suggest to one of ordinary skill in the art.

SUMMARY

Example embodiments may provide an augmented content providing method that may augment and provide only content associated with a corresponding unit space in an image when a user terminal is present in a preset unit space in providing augmented content in an image through an augmented reality (AR) view including the image captured by a camera of a user terminal.

Example embodiments may provide a method of determining whether a user terminal is present in a preset unit space and changing settings of an application for providing an AR view based on an attribute of a corresponding unit space (e.g., indoors or outdoors) when the user terminal is present in the preset unit space.

Example embodiments may provide a method of determining an entry/exit status of a user terminal in a preset unit space, filtering content to be augmented and displayed using an AR view, and changing an indication for the unit space that the user terminal enters and exits from in a map view provided along with the AR view.

According to an example embodiment, an augmented content providing method performed by a computer system that is a server or a user terminal may include determining whether the user terminal is present in a preset unit space based on a location of the user terminal, and in response that the user terminal is determined to be present in the unit space, augmenting and displaying at least one content associated with the unit space in an image, through an augmented reality (AR) view that includes the image captured by a camera of the user terminal, wherein the unit space is predefined as a layer on a map for a space corresponding to at least a portion of the space in which the user terminal moves, independently of the location of the user terminal or a distance from the user terminal, wherein the unit space corresponds to a service target area that provides a service including the content within the space, and wherein the content is associated with the layer and is mapped to at least one object within the unit space.

The unit space may be predefined by a plurality of layers having a hierarchical relationship with each other, and each of the plurality of layers defines a sub-unit space having a hierarchical relationship therewith.

At least a portion of the unit space may overlap another unit space preset for the space, and the another unit space may be another portion of the space and may be predefined as another layer on the map, independently of the location of the user terminal or the distance from the user terminal.

The unit space may be predefined as a three-dimensional (3D) space of at least a portion within the space, and the determining may include determining whether the user terminal is present in the unit space that is the 3D space based on the location of the user terminal including a height of the user terminal.

A plurality of unit spaces including the unit space may be defined in a space in which the user terminal moves, and the displaying may include augmenting and displaying, in the image, at least one content associated with the unit space in which the user terminal is determined to be present, without augmenting and displaying, in the image, content associated with another unit space adjacent to the unit space, content associated with another unit space present within a predetermined radius from the location of the user terminal, or content associated with an object outside the unit space present and within the predetermined radius from the location of the user terminal.

The determining may include determining entry of the user terminal into the unit space, the displaying may include, when the user terminal entered the unit space, augmenting and displaying, in the image, the content filtered as the content associated with the unit space, and the augmented content providing method may further include determining whether the user terminal has left the unit space based on the location of the user terminal.

The determining of the entry may include, when coordinates corresponding to the location of the user terminal is included in the unit space, determining that the user terminal has entered the unit space, and the determining whether the user terminal has left the unit space may include, when the coordinates corresponding to the location of the user terminal are no longer included within the unit space, determining that the user terminal has left the unit space.

The determining of the entry may include, when the user terminal is determined to have passed through a first node predefined in association with the unit space based on the location of the user terminal, determining that the user terminal has entered the unit space, and the determining whether the user terminal has left the unit space may include, when the user terminal is determined to have passed through a second node predefined in association with the unit space based on the location of the user terminal, determining that the user terminal has left the unit space.

The augmented content providing method may further include, when the user terminal is determined to have left the unit space and moved to another unit space among the plurality of unit spaces, stopping augmenting and displaying the content in the image and augmenting and displaying at least one another content associated with the other unit space.

The augmented content providing method may further include, in response that the user terminal is determined to be present in the unit space, changing settings of an application installed in the user terminal to display the AR view, and the settings of the application may include at least one of a display setting change of the content, a display setting change of a user interface associated with the AR view, or a display setting change of a map associated with the AR view.

The changing of the settings of the application may include, when the unit space in which the user terminal is determined to be present is an outdoor space, changing the settings of the application such that the content is displayed to be relatively large and a scale of the map is relatively reduced and thereby displayed, and when the unit space in which the user terminal is determined to be present is an indoor space, changing the settings of the application such that the content is displayed to be relatively small and a scale of the map is relatively enlarged and thereby displayed.

The unit space may be associated with a plurality of contents, and the displaying may include, when the user terminal is determined to be present in the unit space, augmenting and displaying, in the image, content mapped to an object present within a predetermined distance from the location of the user terminal or a predetermined radius from the location of the user terminal among the plurality of contents based on the location of the user terminal.

The augmented content providing method may further include displaying a map view that includes a map matching the image along with the AR view, and the map displayed through the map view may include the location of the user terminal, the unit space, and the content or an object to which the content is mapped.

The displaying of the map view may include displaying an area corresponding to the unit space in which the user terminal is determined to be present to be distinguished from a remaining area on the map.

The displaying of the map view may include three-dimensionally displaying boundary between the area corresponding to the unit space and the remaining area and highlighting and displaying the area corresponding to the unit space compared to the remaining area.

The sub-unit spaces defined by the plurality of layers may include a first sub-unit space and a second sub-unit space at least partially included in the first sub-unit space.

The second sub-unit space may be a sub-unit space of the first sub-unit space, and the displaying comprises, in response that the user terminal is determined to be present in the second sub-unit space, augmenting and displaying at least one content associated with the second sub-unit space and at least one content associated with the first sub-unit space in the image.

According to an example embodiment, a computer system that implements a user terminal or a server may include at least one processor configured to execute computer-readable instructions included in a memory, wherein the at least one processor is configured to determine whether the user terminal is present in a preset unit space based on a location of the user terminal, and, in response that the user terminal is determined to be present in the unit space, augment and display at least one content associated with the unit space in an image, through an AR view that includes the image captured by a camera of the user terminal, wherein the unit space is predefined as a layer on a map for a space corresponding to at least a portion of the space in which the user terminal moves, independently of the location of the user terminal or a distance from the user terminal, wherein the unit space corresponds to a service target area that provides a service including the content within the space, and wherein the content is associated with the layer and is mapped to at least one object within the unit space.

According to some example embodiments, by presetting a unit space as a layer on a map corresponding to a service target area and by filtering content associated with the corresponding unit space and providing the filtered content through an augmented reality (AR) view when a user terminal is present in the preset unit space, it is possible to block or prevent display of unnecessary augmented content compared to a case of providing the augmented content simply based on a physical distance from the user terminal. Accordingly, it is possible to reduce cognitive load of a user and load of the user terminal.

According to some example embodiments, as content associated with a unit space that a user terminal has entered, only content of a service provided from the corresponding unit space may be provided to the user terminal as augmented content. Therefore, more meaningful content may be provided to a user.

According to some example embodiments, settings of an application for appropriately providing an AR view may be changed depending on an attribute of a preset unit space in which a user terminal is present (e.g., indoors or outdoors). In relation to the unit space that allows the user terminal to enter or exit, display of a map view for the corresponding unit space may be dynamically changed.

DETAILED DESCRIPTION

Hereinafter, some example embodiments are described with reference to the accompanying drawings.

As used herein, expressions such as "at least one of," when preceding a list of elements, modify the entire list of elements and do not modify the individual elements of the list. Thus, for example, both "at least one of A, B, or C" and "at least one of A, B, and C" mean either A, B, C or any combination thereof. Likewise, A and/or B means A, B, or A and B.

Example embodiments relate to a location-based augmented reality (AR) service and also relate to an augmented content providing method that augments and displays content of a service a user desires to receive in an image of an AR view using the AR view displayed on a user terminal 100. In the following description, content augmented and displayed in the image may also be referred to as 'augmented content.'

'Space' related to provision of the augmented content in example embodiments may represent an indoor space and/or an outdoor space. That is, the following space and unit space may be defined as a space that includes an indoor location or an outdoor location and may also be defined as a complex space in which an indoor space and an outdoor space are combined.

In the following description, a location of a user carrying the user terminal 100 may be explained as a location of the user terminal 100 for clarity of description. Also, for clarity of description, the "user" and the "'user terminal 100" of the user may be interchangeably used.

In the following description, "augmenting and displaying" content and/or information (e.g., indicator, etc.) in an image may be interpreted as encompassing overlappingly displaying the corresponding content and/or information on the image/screen of AR view depending on example embodiments.

Figure 1A:
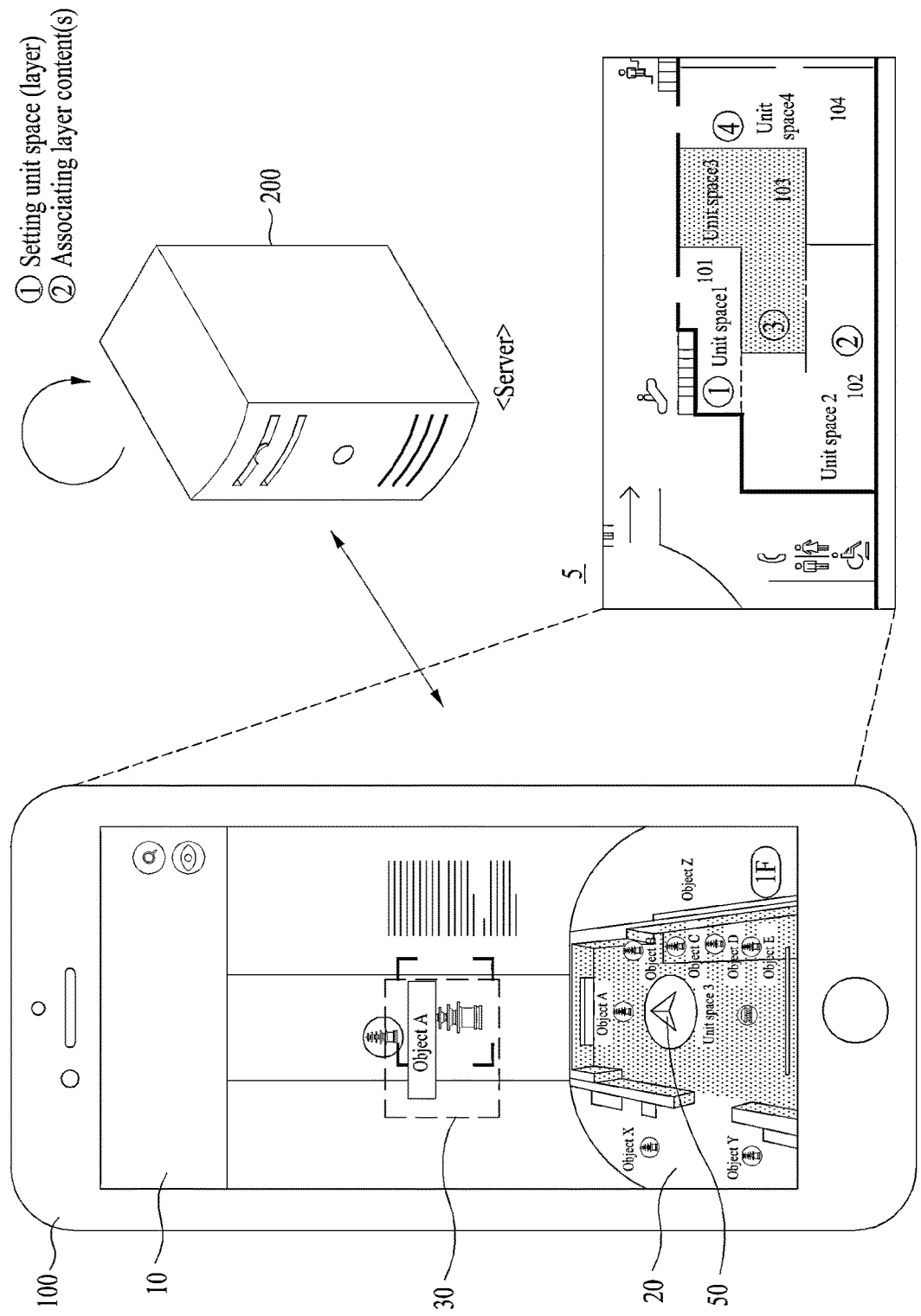
FIG. 1A illustrates an augmented content providing method for augmenting and displaying content in an image of an augmented reality (AR) view based on a desired (or alternatively, preset) unit space according to an example embodiment.
Figure 1B:
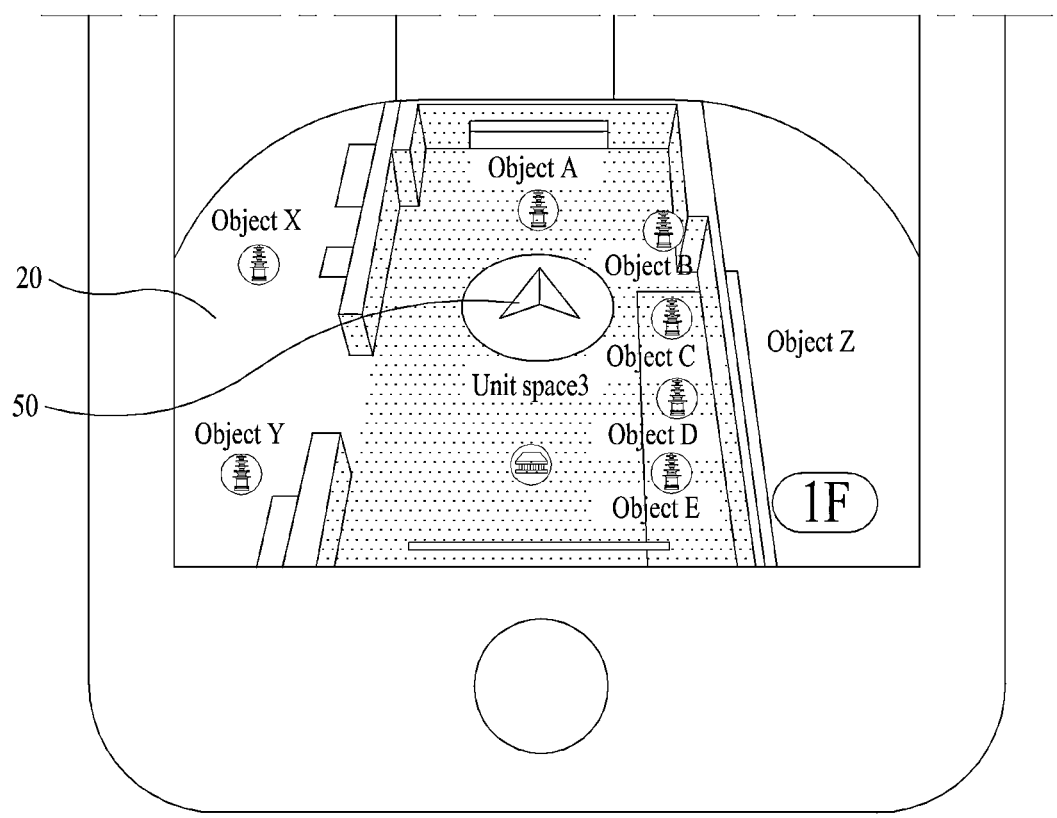
FIG. 1B illustrates a map view on a screen of a user terminal of FIG. 1A in more detail.

FIG. 1A illustrates an augmented content providing method for augmenting and displaying content in an image of an AR view based on a desired (or alternatively, preset) unit space according to an example embodiment. FIG. 1B illustrates a map view on a screen of a user terminal of FIG. 1A in more detail.

As illustrated, the user terminal 100, such as, a smartphone, may capture surroundings using a camera and may augment and display content 30 mapping an object present in a space in an image an AR view 10.

In an example embodiment, whether the user terminal 100 is present within a desired (or alternatively, preset) unit space may be determined based on a location of the user terminal 100 and when the user terminal 100 is determined to be present within the desired (or alternatively, preset) unit space, the content 30 associated with the corresponding unit space may be augmented and displayed in the image of the AR view 10.

'Desired (or alternatively, preset) unit space' may be defined or preset by a server 200. The server 200 (e.g., content providing server) may set at least a partial area of a space 5 in which the user terminal 100 moves or a distinct partial area of the space 5 as a unit space. The unit space may be defined dependently of a location of the user terminal 100 or a distance from the user terminal 100.

The space 5 may be an indoor space or an outdoor space, or may be a complex space in which the indoor space and the outdoor space are included. The space 5 may be a service target area for providing a service that includes provision of content. Each unit space may be defined as a layer for the space 5. The layer for the space 5 may be a layer on a map for the space 5.

For example, as illustrated, unit spaces 1, 2, 3, and 4 may be defined in the space 5. The server 200 may associate at least one content with each unit space. At least one object may be provided in a unit space. The server 200 may associate content and a unit space with each other by mapping the content to at least one object in the unit space. That is, the content may be associated with a layer corresponding to the unit space.

In the illustrated example, as the user terminal 100 is determined to be present in unit space 3, the user terminal 100 may augment and display the content 30 of object A in the image through the AR view 10. The content 30 is associated with desired (or alternatively, preset) unit space 3 and may be mapped to object A among objects provided in unit space 3. As such, in an example embodiment, the content 30 associated with unit space 3 in which the user terminal 100 is determined to be present may be provided to the user terminal 100 as augmented content.

Here, the content 30 associated with unit space 3 is displayed through the AR view 10 of the user terminal 100, but content associated with another unit space (e.g., unit space 1 or unit space 4) physically close to a location of the user terminal 100 but in which the user terminal 100 is not present or content mapped to objects (e.g., objects X, Y and Z) absent in unit space 3 may not be displayed. That is, content associated with unit space 1 or unit space 4 or content mapped to objects X, Y and Z does not need to be provided to the user terminal 100 present in unit space 3 divided by walls in the space 5.

In an example embodiment, because only the content associated with unit space 3 in which the user terminal 100 is present is filtered and displayed through the AR view 10, display of unnecessary or undesired augmented content may be blocked or prevented. Therefore, cognitive load of a user and load of the user terminal may be reduced.

The content 30 may provide information on an object to which the corresponding content 30 is mapped. For example, the content 30 may include a text, a two-dimensional (2D) image or a three-dimensional (3D) image, and other multimedia content as information on the object to which the content 30 is mapped. The content 30 may include an icon representing a type or a kind of the mapped object.

For example, when the space 5 is a museum and each of unit spaces 1 to 4 corresponds to an exhibition hall in the museum, an object may correspond to a thing (exhibit, exhibit product, artifact, etc.) in the exhibition hall and the content 30 may include information to explain the thing corresponding to object A. In the illustrated example, only the content 30 mapped to object A is displayed in the AR view 10, but at least one content mapped to other objects (objects B to E) provided in unit space 3 may be further displayed through the AR view 10.

The AR view 10 and a map view 20 including a map matching the image of the AR view 10 may be further displayed together on a screen of the user terminal 100. The map view 20 may include a current location 50 of the user terminal 100. The map view 20 may include a two-dimensional (2D) map or a three-dimensional (3D) map. The map view 20 may include a unit space in which the user terminal 100 moves, content provided to the user terminal 100, or an object to which the content is mapped. Meanwhile, as illustrated, an area corresponding to the unit space in which the user terminal 100 is present in the map view 20 may be displayed to be visually distinguished from remaining areas.

The user terminal 100 may communicate with the server 200 to display the augmented content through the AR view 10 and to display the map view 20. The server 200 may provide, to the user terminal 100, the content 30 associated with the unit space in which the user terminal 100 is present according to movement of the user terminal 100 and may provide, to the user terminal 100, map information for displaying the map view 20 according to movement of the user terminal 100.

As described above, the server 200 may be a server that defines and manages a unit space for the space 5 and manages registration, change, and deletion of content associated with each unit space. Also, the server 200 may be a map server that provides a digital map (3D map and/or 2D).

A more specific method of setting a unit space through the server 200 and a specific method of determining entry of the terminal 100 into the unit space and providing augmented content to the user terminal 100 are further described with reference to FIGS. 2 to 13.

Figure 2:
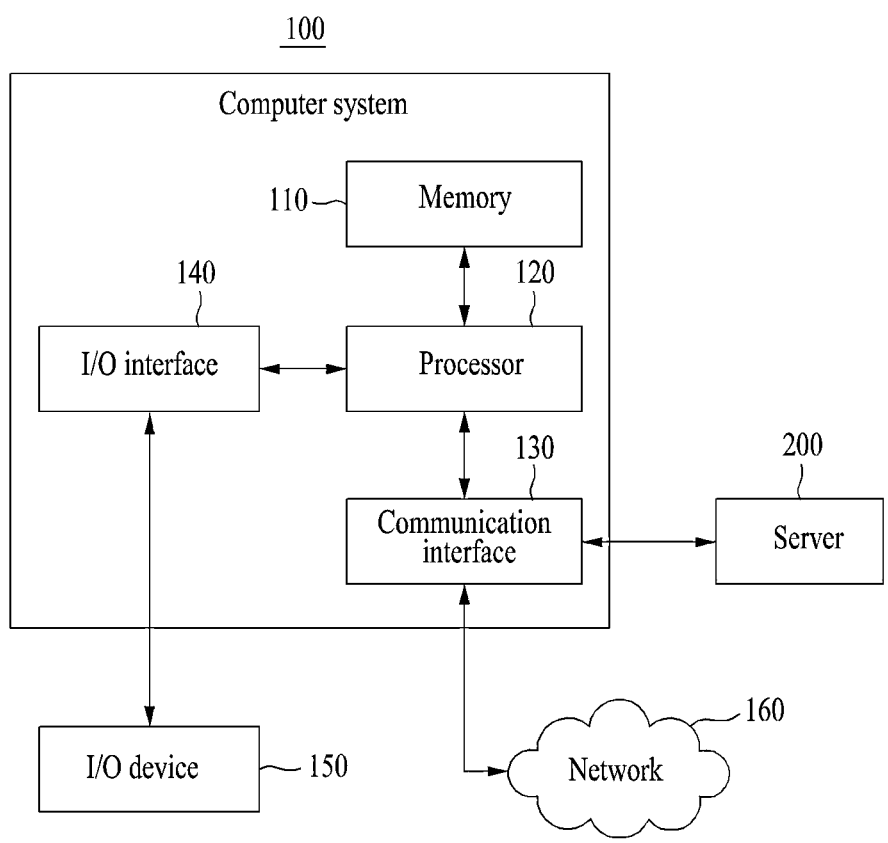
FIG. 2 is a diagram illustrating a computer system and a server to perform an augmented content providing method according to an example embodiment.

FIG. 2 is a diagram illustrating an example of a computer system and a server that perform an augmented content providing method according to at least one example embodiment.

The user terminal 100 of FIGS. 1A and 1B according to some example embodiments may be implemented through the computer system 100. For example, a computer program for implementing a method of an example embodiment may be installed and run on the computer system 100 and the computer system 100 may perform an augmented content providing method according to some example embodiments under control of the running computer program.

The augmented content providing method according to some example embodiments may be implemented through a PC-based program or a dedicated application of a mobile terminal. For example, the augmented content providing method may be implemented in a form of a program that independently operates or may be implemented in an in-app form of a specific application to be operable on the specific application. The specific application may be installed on the computer system 100 to provide augmented content 30 through the AR view 10 and may perform the augmented content providing method.

The computer system 100 refers to an electronic device corresponding to the aforementioned user terminal 100 and may be a smartphone and a device similar thereto that may install and execute an application or a program as illustrated in FIGS. 1A and 1B. Also, the computer system 100 may be, for example, a personal computer (PC), a notebook computer (laptop computer), a tablet, an Internet of things (IoT) device, or a wearable computer.

Referring to FIG. 2, the computer system 100 may include a memory 110, a processor 120, a communication interface 130, and an input/output (I/O) interface 140 as components for performing the augmented content providing method.

The memory 110 may include a permanent mass storage device, such as a random access memory (RAM), a read only memory (ROM), and a disk drive, as a computer-readable record medium. The permanent mass storage device, such as ROM and a disk drive, may be included in the computer system 100 as a permanent storage device separate from the memory 110. Also, an OS and at least one program code may be stored in the memory 110. Such software components may be loaded to the memory 110 from another computer-readable record medium separate from the memory 110. The other computer-readable record medium may include a computer-readable record medium, for example, a floppy drive, a disk, a tape, a DVD/CD-ROM drive, a memory card, etc. According to other example embodiments, software components may be loaded to the memory 110 through the communication interface 130, instead of the computer-readable record medium. For example, the software components may be loaded to the memory 110 of the computer system 100 based on a computer program installed by files received over the network 160.

The processor 120 may be configured to process instructions of a computer program by performing basic arithmetic operations, logic operations, and I/O operations. The instructions may be provided from the memory 110 or the communication interface 130 to the processor 120. For example, the processor 120 may be configured to execute received instructions in response to the program code stored in the storage device, such as the memory 110.

That is, the processor 120 may manage components of the computer system 100, and may execute a program or an application used by the computer system 100. For example, the processor 120 may be configured to execute an application for performing an augmented content providing method according to an example embodiment and to process data received from the server 200 to provide the augmented content 30 through the AR view 10. Also, the processor 120 may process an operation required for execution of the program or the application and processing of data. The processor 120 may be at least one processor of the computer system 100 or at least one core within the processor.

The communication interface 130 may provide a function for communication between the communication system 100 and another computer system (not shown) through the network 160. For example, the processor 120 of the computer system 100 may forward a request or an instruction created based on a program code stored in the storage device such as the memory 110, data, and a file, to other computer systems over the network 160 under control of the communication interface 130. Inversely, a signal or an instruction, data, a file, etc., from another computer system may be received at the computer system 100 through the communication interface 130 of the computer system 100. A signal or an instruction, data, etc., received through the communication interface 130 may be forwarded to the processor 120 or the memory 110, and a file, etc., may be stored in a storage medium (the permanent storage device), further includable in the computer system 100. For example, the communication interface 130 may be a hardware module such as a network interface card, a network interface chip, and a networking interface port of the computer system 100, or a software module such as a network device driver and a networking program.

The I/O interface 140 may be a device used for interfacing with an I/O device 150. For example, an input device may include a device, such as a microphone, a keyboard, a mouse, etc., and an output device may include a device, such as a display, a speaker, etc. As another example, the I/O interface 140 may be a device for interfacing with an apparatus in which an input function and an output function are integrated into a single function, such as a touchscreen. The I/O device 150 may be configured as a single apparatus with the computer system 100.

Also, in other example embodiments, the computer system 100 may include the number of components greater than or less than the number of components shown in FIG. 2. However, there is no need to clearly illustrate many components according to the related art. For example, the computer system 100 may include at least a portion of I/O devices connected to the I/O interface 140, or may further include other components, for example, a transceiver, a global positioning system (GPS) module, a camera, various sensors, and a database. For example, if the computer system 100 is implemented in a form of a mobile device such as a smartphone, the computer system 100 may be implemented to further include various components, for example, a camera, an acceleration sensor or a gyro sensor, various physical buttons, a button using a touch panel, an I/O port, and a vibrator for vibration, which are generally included in the mobile device. For example, the computer system 100 corresponding to the user terminal 100 may include a camera configured to capture surroundings to execute the AR view 10. The computer system 100 may display an image captured through the camera using the AR view 10, and may augment and display the content 30 in the image of the AR view 10. For example, the computer system 100 may determine whether the computer system 100 is present in a desired (or alternatively, preset) unit space according to positioning. When the computer system 100 is present in the desired (or alternatively, preset) unit space, the computer system 100 may augment and display the content 30 associated with the corresponding unit space in the image of the AR view 10. Here, an actual operation of determining whether the computer system 100 is present in the desired (or alternatively, preset) unit space may be performed by the server 200, not the computer system 100.

The server 200 may be an electronic device that provides (augmented) content to the computer system 100 and manages the corresponding augmented content through communication with the computer system 100. The server 200 may include a database or may communicate with the database as a device that manages (registers, changes, deletes, stores, maintains, etc.) content to be provided to the computer system 100 and a unit space associated with the content. Also, the server 200 may be a map server that provides a digital map (3D map and/or 2D map) or may include the map server.

The server 200 may include at least one computer system. The computer system included in the server 200 may include components similar to those of the computer system 100 and further description related thereto is omitted.

In an example embodiment, when providing the augmented content 30 through the AR view 10, the user terminal 100 that is the computer system 100 may augment and display the content 30 in the image through the AR view 10. Here, the server 200 may receive a location of the user terminal 100, may determine whether the user terminal 100 is present within the unit space based on the received location, and, when the user terminal is present within the unit space, may provide content associated with the corresponding unit space to the user terminal 100.

In the following description, for clarity of explanation, some example embodiments are described based on the computer system 100 corresponding to the user terminal 100 and description related to communication with the server 200 and an operation on the side of the server 200 may be simplified or omitted.

Also, in the following description, for clarity of explanation, it may be described that operations performed by a component (e.g., processor, etc.) of the computer system 100 (or the server 200) are performed by the computer system 100 (or the server 200).

Description related to technical features made above with reference to FIG. 1 may apply as is to FIG. 2 and thus, repeated description is omitted.

Figure 3:
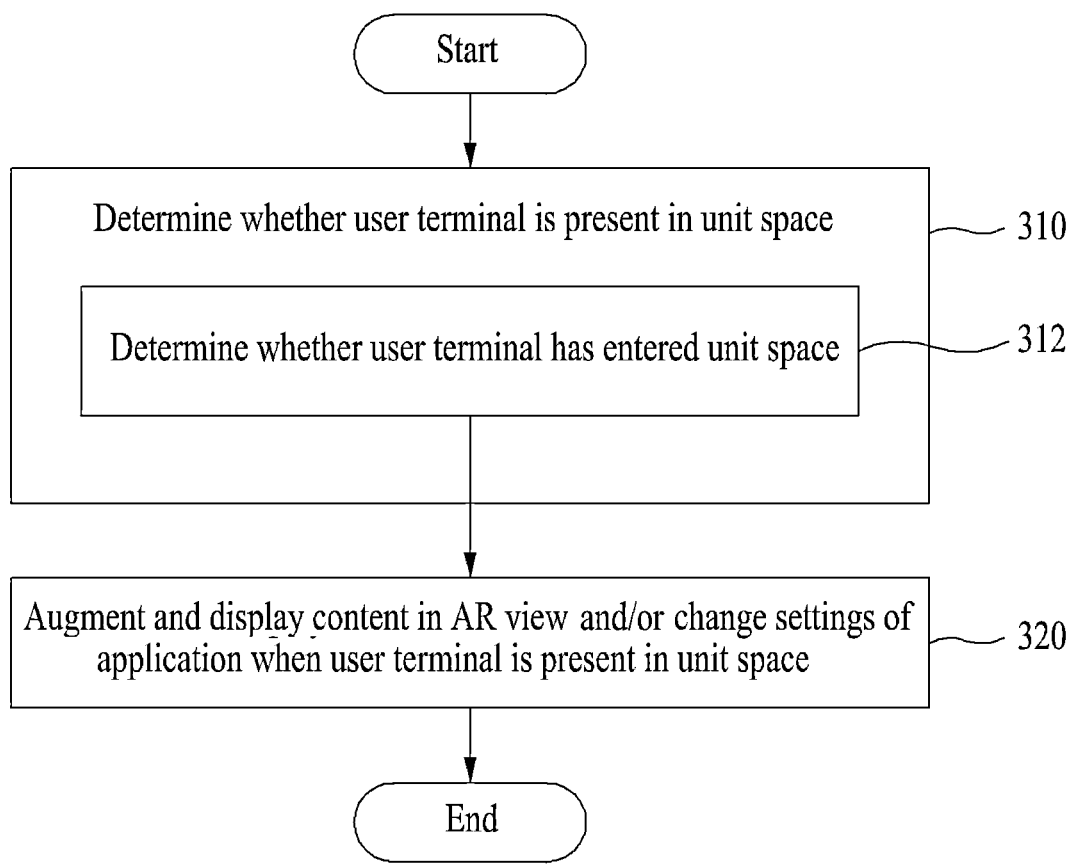
FIG. 3 is a flowchart illustrating an augmented content providing method to augment and display content in an image of an AR view based on a desired (or alternatively, preset) unit space according to an example embodiment.

FIG. 3 is a flowchart illustrating an augmented content providing method to augment and display content in an image of an AR view based on a desired (or alternatively, preset) unit space according to an example embodiment.

The augmented content providing method performed by the computer system 100 is described with reference to FIG. 3. The computer system 100 may correspond to the user terminal 100 of FIG. 1 and the following description is made using the term "user terminal 100" instead of the computer system 100. Also, at least a portion of the following operations 310 to 320 and operations described with reference to FIGS. 4 and 5 may be configured to be performed by not the user terminal 100 but the server 200. In the following, description related to operations is made based on the user terminal 100 and repeated description related to the server 200 may be omitted.

In operation 310, the user terminal 100 or the server 200 may determine whether the user terminal 100 is present in a desired (or alternatively, preset) unit space based on a location of the user terminal 100. The user terminal 100 may determine the location of the user terminal 100 through, for example, a method based on at least one of a global positioning system (GPS), a visual positioning system (VPS), a wireless fidelity (Wi-Fi) positioning system (WPS), and may determine whether the user terminal 100 is present in the desired (or alternatively, preset) unit space based on the determined location. In some example embodiments, the server 200 may receive the determined location of the user terminal 100 and may determine whether the received location is present in the set unit space.

In some example embodiments, whether the user terminal 100 is present in the desired (or alternatively, preset) unit space may be determined based on communication between a communication module (e.g., short-distance communication module, access point (AP), beacon, etc.) present in the unit space and the user terminal 100. For example, a location of the user terminal 100 may be determined based on strength (e.g., signal strength) of communication between the user terminal 100 and at least one communication module or communication-based positioning (triangulation), and whether the user terminal 100 is present in the unit space may be determined.

As in operation 312, to determine whether the user terminal 100 is present in the unit space, the user terminal 100 or the server 200 may determine whether the user terminal 100 has entered the unit space. A specific method of determining whether the user terminal 100 has entered unit space or whether the user terminal 100 has left the unit space is further described with reference to FIGS. 4 and 8.

In operation 320, as the user terminal 100 is determined to be present in the unit space, the user terminal 100 or the server 200 may augment and display at least one content 30 associated with the unit space in an image through the AR view 10 that includes the image captured by a camera of the user terminal 100. For example, the user terminal 100 may receive the content 30 or information/data for displaying the content 30 from the server 200 and may augment and thereby display the content 30 in the image. As the user terminal 100 is determined to be present in the unit space, the server 200 may control the user terminal 100 to augment and display the content 30 associated with the corresponding unit space in the image through the AR view 10.

Alternatively/additionally, in operation 320, as the user terminal 100 is determined to be present in the unit space, the user terminal 100 or the server 200 may change settings of an application installed on the user terminal 100 to display the AR view 10. For example, the server 200 may control the user terminal 100 to change settings of the application installed on the user terminal 100.

The changed settings of the application may include at least one of a display setting change of the content 30 augmented and displayed in the image, a display setting change of a user interface associated with the AR view 10, and a display setting change of a map associated with the AR view 10 (e.g., map of the map view 20).

A more specific method of changing settings of an application is further described with reference to FIG. 10.

In the following, a method of setting or defining a unit space for a space in which the user terminal 100 moves and a method of associating content to the unit space are further described with reference to FIGS. 6, 7, and 13.

Figure 6:
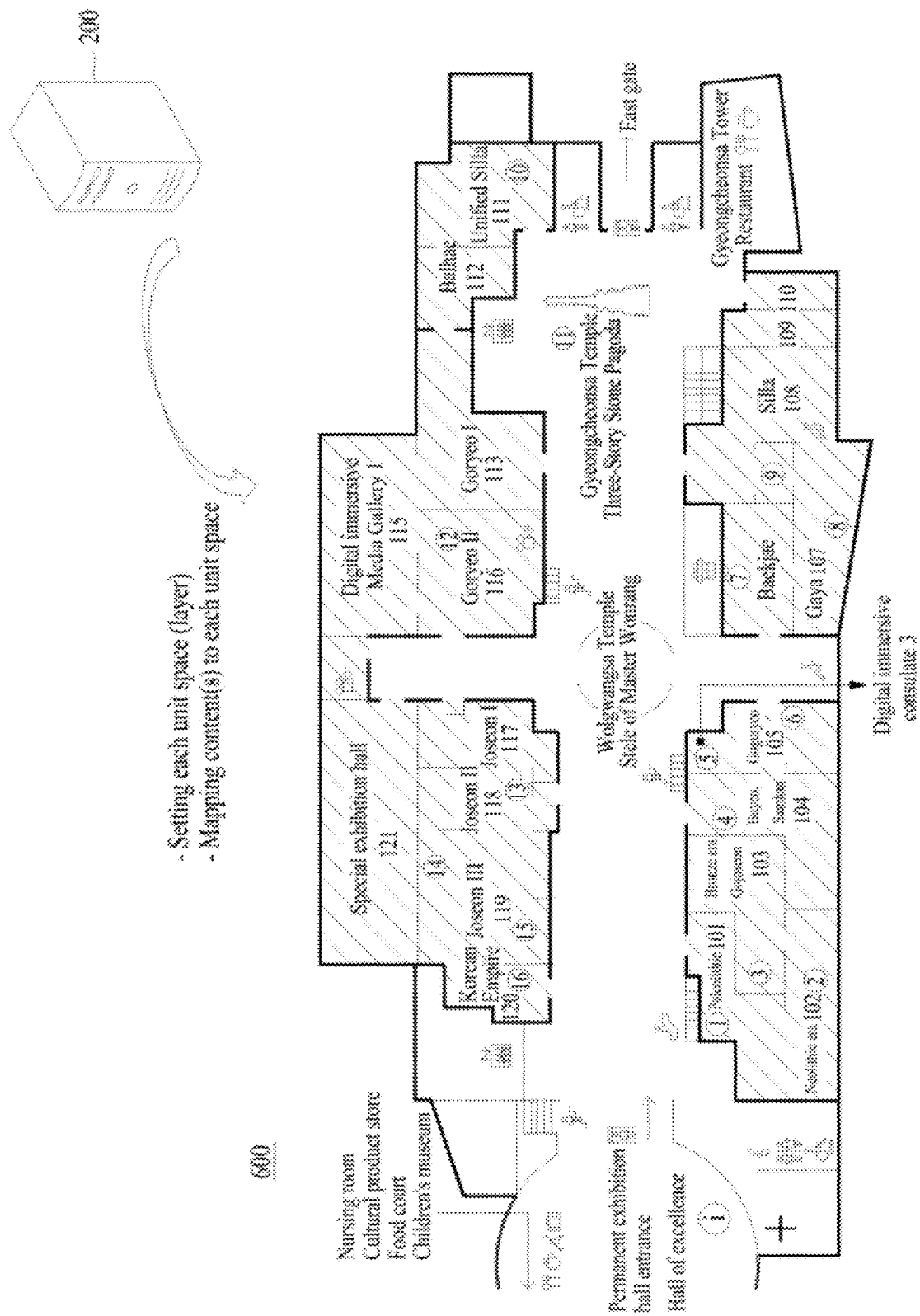
FIG. 6 illustrates a method of setting a unit space and mapping content in the unit space according to an example embodiment.

In this regard, FIG. 6 illustrates a method of setting a unit space and mapping content in the unit space according to an example.

For a space 600 in which the user terminal 100 moves, the server 200 may define a unit space independently of (or regardless of) a location of the user terminal 100 or a distance from the user terminal 100. The unit space refers to at least a portion of the space 600 and may be predefined prior to providing augmented content to the user terminal 100. As in the illustrated example, the unit space may be an indoor space. However, depending on example embodiments, the unit space may be an outdoor space or may be a complex space in which the indoor space and the outdoor space are combined.

The server 200 may define each separate area of the space 600, for example, a service target area for providing a service as the unit space. Here, the unit space may be a layer defined on the space 600 that represents a map. That is, each unit space defined in the space 600 may be a layer.

A name or an identifier may be assigned to each layer (unit space). For example, as illustrated, for the space 600 that is a museum, a layer corresponding to each exhibition hall may be defined as a unit space and each unit space may be assigned with a name of a corresponding exhibition hall (or exhibition hall number). A name or an ID assigned to the unit space may be displayed on the AR view 10 as augmented content when the user terminal 100 enters the corresponding exhibition hall. Therefore, the user's service experience upon entering the unit space may be improved.

The server 200 may associate at least one content with each unit space. For example, the server 200 may associate the content with the unit space by mapping the content to an object provided in the unit space. Therefore, the content may be associated with the layer corresponding to the unit space.

As described above, the unit space set by the server 200 may correspond to semantic range for providing augmented content corresponding to a service to the user terminal 100.

Figure 13A:
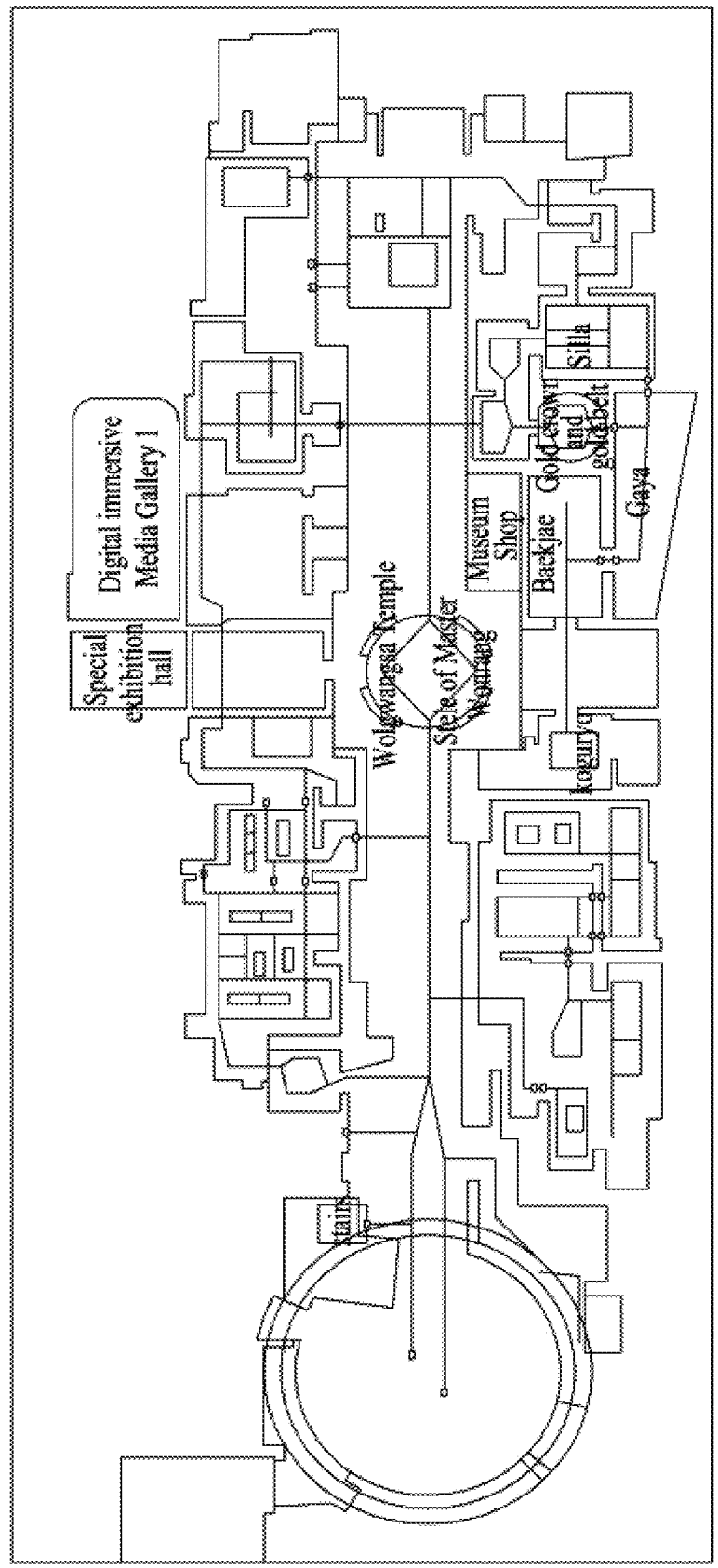
FIGS. 13A and 13B illustrate a method of defining a unit space corresponding to semantic range for providing augmented content for a space according to an example embodiment.
Figure 13B:
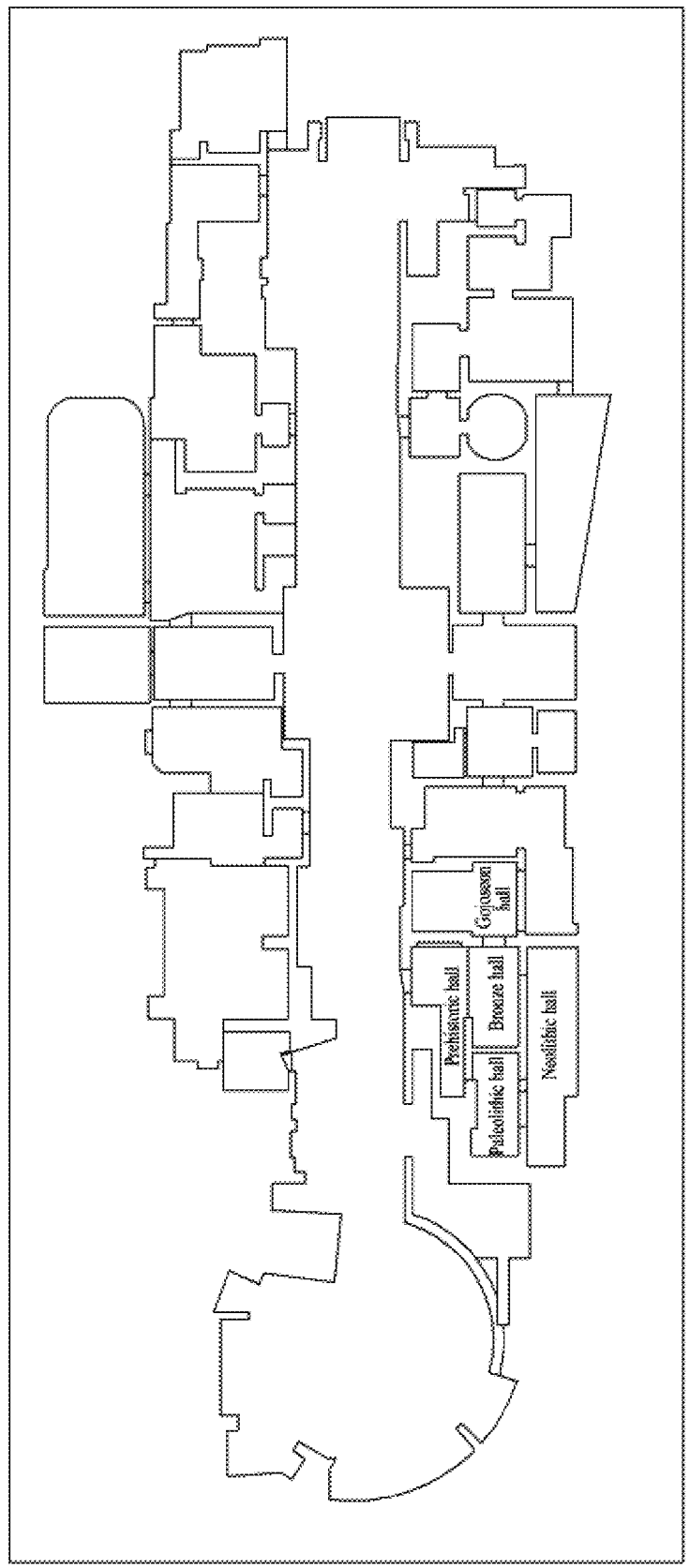

In this regard, FIGS. 13A and 13B illustrate a method of defining a unit space corresponding to semantic range for providing augmented content for a space according to an example.

As illustrated in FIG. 13A, a path along which the user terminal 100 moves may be mapped on a map (or drawing) corresponding to the space 600. This path may include a plurality of nodes and links that connect between nodes. The server 200 may set a service target area for providing a specific service within the space 600 as a unit space based on this mapped path. For example, as illustrated in FIG. 13B, based on the path mapped in the space 600 that is a museum, each exhibition hall of the museum, such as prehistoric hall, paleolithic hall, bronze hall, Gojoseon hall, and neolithic hall, may be set as a unit space. Each exhibition hall set as the unit space may be semantic range for providing augmented content of a service suitable for the corresponding space.

As described above, the unit space may be defined based on the map of the space 600 to provide the service and may be defined by geodata based on coordinates. The server 200 may generate and store geodata that defines and classifies this unit space.

Geodata that represents the unit space may include 2D coordinates (e.g., x, y coordinates or coordinate value range as plane coordinates). The unit space may be configured using a figure made up of 2D plane. The figure may include a polygon. Whether the user terminal 100 is present in the unit space may be determined by comparing or based on a 2D location of the user terminal 100 and geodata of the unit space.

Further, the unit space may be defined as a 3D space of at least a portion within the space 600. Here, geodata that represents the unit space may include 3D coordinates (e.g., x, y, z coordinates, or coordinate value range). As the geodata representing the unit space includes height information such as Z coordinate, the unit space of the space 600 may represent a space of a specific floor. That is, the unit space may be separated even by a vertical height (e.g., floor). The unit space may be configured as a 3D figure made up of 3D space.

In operation 310 described above, the user terminal 100 or the server 200 may determine whether the user terminal 100 is present in the unit space that is the 3D space, based on a location of the user terminal 100 that includes the height (e.g., a vertical position) of the user terminal 100. That is, whether the user terminal 100 is present in the unit space may be determined by comparing or based on a 3D location of the user terminal 100 and the geodata of the unit space that is the 3D space.

Meanwhile, unit spaces defined for the space 600 may be defined to overlap and/or have a hierarchical relationship.

Figure 7:
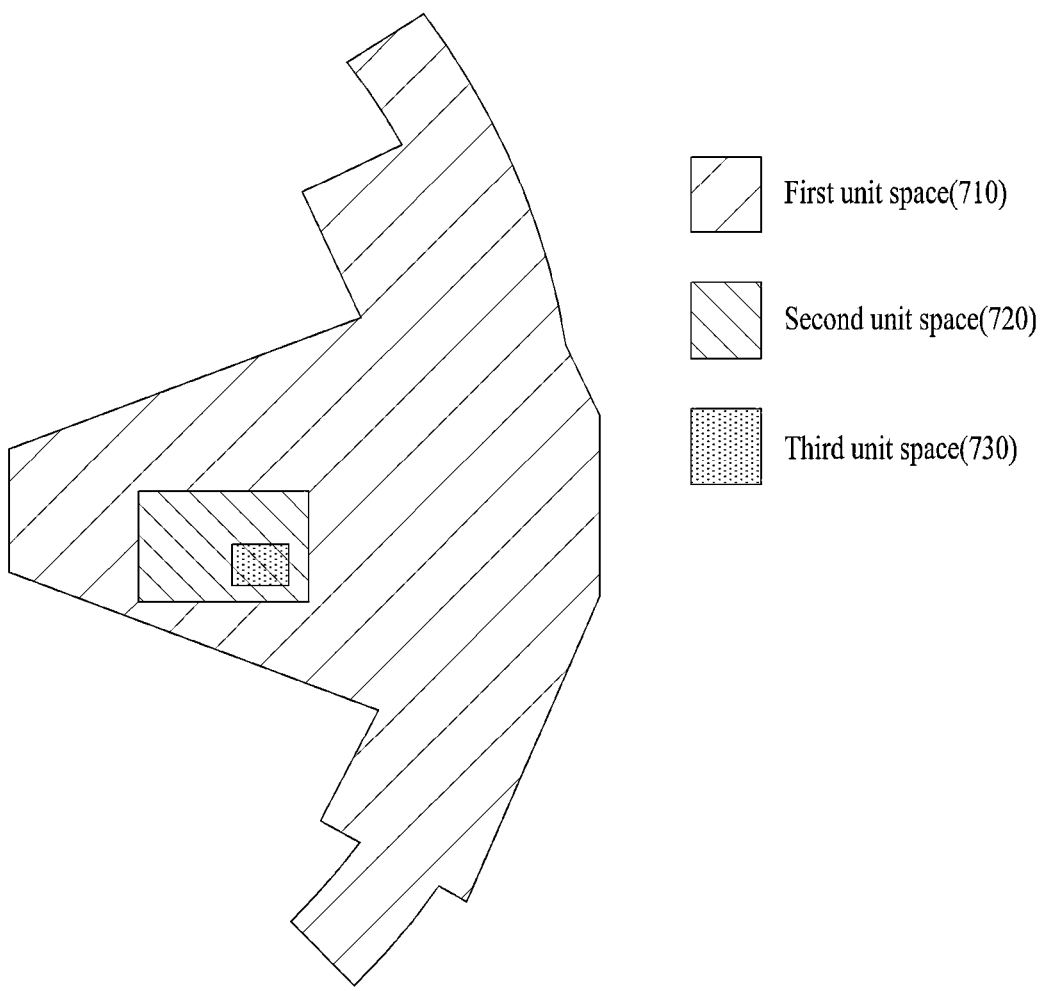
FIG. 7 illustrates a method of setting unit spaces overlapping and/or having a hierarchical relationship according to an example embodiment.

In this regard, FIG. 7 illustrates a method of setting unit spaces overlapping and/or having a hierarchical relationship according to an example.

An illustrated space 700 may correspond to a space in which the user terminal 100 moves or may correspond to a service provision area for providing a service.

In this space 700, a plurality of unit spaces (710 to 730) including a first unit space 710 and a second unit space 720 at least partially included in the first unit space 710 may be defined.

The second unit space 720 may be a space that partially overlaps the first unit space 710, or may be a space completely included in the first unit space 710 as illustrated. Meanwhile, the third unit space 730 may be a space that partially overlaps the first unit space 710 and/or the second unit space 720, or may be a space that is completely included in the first unit space 710 and the second unit space 720 as illustrated.

In the illustrated example, the second unit space 720 may be a lower unit space of the first unit space 710. Meanwhile, the third unit space 730 may be a lower unit space of the first unit space 710 and the second unit space 720.

As such, the server 200 may define layers corresponding to unit spaces that overlap each other in the space 700 and may define layers corresponding to unit spaces having a hierarchical relationship with each other. As the unit spaces have a hierarchical relationship with each other, contents associated with the unit spaces may also have the same hierarchical relationship with each other.

For example, the server 200 may set a layer corresponding to Incheon International Airport Passenger Terminal 2 as the unit space 710 that is a top unit space, may set a layer corresponding to the Sky Hub Lounge In Passenger Terminal 2 as a lower unit space 720 of the unit space 710, and may set a layer corresponding to Starbucks in the Sky Hub Lounge as a lower unit space 730 of the unit space 720.

As such, the server 200 may define a layer corresponding to the entire space (airport) as an upper unit space and may define a lower layer corresponding to its internal space (shopping mall, restaurant, airline desk, etc.) as a lower unit space, such that a hierarchical relationship is established between unit spaces. Display of the augmented content in operation 320 described above may be performed based on this hierarchical relationship.

For example, in operation 320, as the user terminal 100 is determined to be present in the second unit space 720, the user terminal 100 or the server 200 may augment and display, in the image, at least one content associated with the second unit space 720 and at least one content associated with the first unit space 710. That is, when the user terminal 100 enters the lower unit space, the user terminal 100 may augment and display content associated with the corresponding lower unit space and content associated with its upper unit space in the image of the AR view 10.

Meanwhile, a unit space that is defined to overlap or a unit space having a hierarchical relationship may be defined as the aforementioned 3D space. In this regard, repeated description is omitted.

Hereinafter, a method of augmenting and displaying content associated with a corresponding unit space in an image of the AR view 10 as the user terminal 100 is determined to be present in the desired (or alternatively, preset) unit space is further described.

As described above, a plurality of unit spaces may be defined in a service space that is a space in which a user terminal moves.

The user terminal 100 may augment and display, in the image, only at least one content associated with a unit space in which the user terminal 100 is currently present, without augmenting and displaying, in the image, content associated with another unit space adjacent to the unit space in which the user terminal 100 is currently present, content associated with another unit space present within a desired (or alternatively, certain or predetermined) radius from a location of the user terminal 100, or content associated with an object other than the unit space present within the desired (or alternatively, certain or predetermined) radius from the location of the user terminal 100.

In other words, the user terminal 100 may not display the augmented content based on the desired (or alternatively, certain or predetermined) radius or distance from the location of the user terminal 100 corresponding to typical rendering range, but rather may display the augmented content based on the semantic range defined as the unit space.

Referring again to FIG. 1, the content 30 associated with unit space 3 in which the user terminal 100 is currently present is displayed through the AR view 10 of the user terminal 100. However, although a unit space is physically close to the location of the user terminal 100, that is, content associated with another unit space (e.g., unit space 1 or unit space 4 adjacent to unit space 3) in which the user terminal 100 is not present and content mapped to objects (e.g., objects X, Y, and Z) not present in unit space 3 may not be displayed.

As such, like content associated with unit space 1 or unit space 4 or content mapped to objects X, Y, and Z, content that does not need to be provided to the user terminal 100 present in unit space 3 separated by wall/partition within the space 5 may not be displayed through the view 10.

In an example embodiment, because only the content associated with unit space 3 in which the user terminal 100 is currently present is filtered and displayed through the AR view 10, display of the undesirable augmented content may be blocked or prevented. Therefore, cognitive load of the user and load of the user terminal 100 may be reduced.

Description related to technical features made above with reference to FIGS. 1 and 2 may apply as is to FIGS. 3, 6, 7, and 13 and thus, repeated description is omitted.

Figure 4:
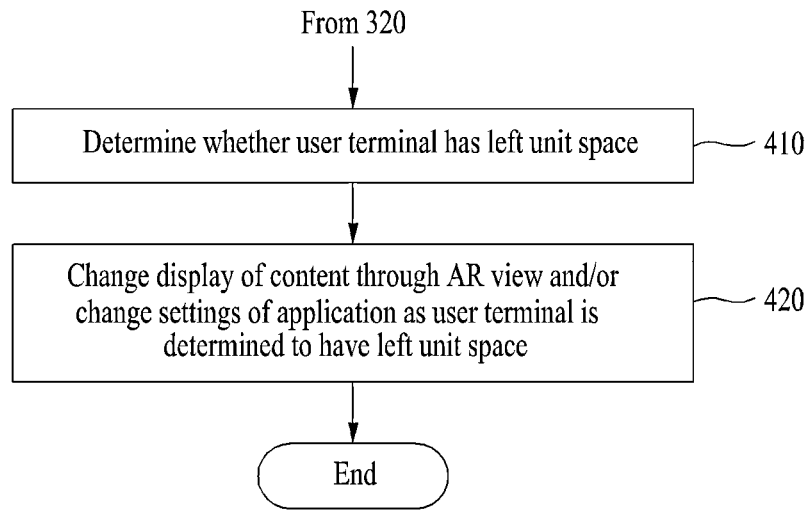
FIG. 4 is a flowchart illustrating a method of changing display of content of an AR view and/or settings of an application depending on determining whether a user terminal is outside a unit space according to an example embodiment.

FIG. 4 is a flowchart illustrating a method of changing display of content of an AR view and/or settings of an application depending on determining whether a user terminal leaves a unit space according to an example.

A method of determining entry/exit of the user terminal 100 into/from the unit space and changing display of the content 30 through the AR view 10 and/or settings of an application is described with reference to FIG. 4.

In operation 312 described above with reference to FIG. 3, the user terminal 100 or the server 200 may determine whether the user terminal 100 has entered the unit space to determine whether the user terminal 100 is present in the unit space. When the user terminal 100 is determined to have entered the unit space, content filtered as content associated with the unit space may be augmented and displayed in the image. That is, when the entry of the user terminal 100 into the unit space is verified, the server 200 may filter the content associated with the corresponding unit space and may provide the filtered content to the user terminal 100 such that the augmented content is displayed on the user terminal 100.

In operation 410, the user terminal 100 or the server 200 may determine whether the user terminal 100 has left the unit space based on the location of the user terminal 100.

For example, if coordinates corresponding to the location of the user terminal 100 are included in the unit space in determining entry into the unit space, the user terminal 100 or the server 200 may determine that the user terminal 100 has entered the unit space. Also, if coordinates corresponding to the location of the user terminal 100 are no longer included in the unit space in determining entry into the unit space, the user terminal 100 or the server 200 may determine that the user terminal 100 has left the unit space.

Depending on whether coordinates (2D coordinates or 3D coordinates) corresponding to the location of the user terminal 100 are included in a figure (2D figure or 3D figure) that is a layer representing the unit space, an entry/exit status of the user terminal 100 in the unit space may be determined. The entry/exit of the user terminal 100 into/from the unit space may be determined by comparing or based on coordinates corresponding to the location of the user terminal 100 and geodata of the unit space.

As another example, in determining the entry/exit into/from the unit space, when the user terminal 100 is determined to have passed through a first node predefined in association with the unit space based on the location of the user terminal 100, the user terminal 100 or the server 200 may determine that the user terminal 100 has entered the unit space. The first node may be an entrance point that is desired (or alternatively, preset) for the unit space. Also, in determining the entry/exit into/from the unit space, when the user terminal 100 is determined to have passed through a second node predefined in association with the unit space based on the location of the user terminal 100, the user terminal 100 or the server 200 may determine that the user terminal 100 has left the unit space. The second node may be an exit point that is desired (or alternatively, preset) for the unit space.

At least one of each of the entrance point and the exit point may be set for the unit space. Each of the entrance point and the exit point may be a predefined node through which the user terminal 100 may pass in the unit space.

Figure 8:
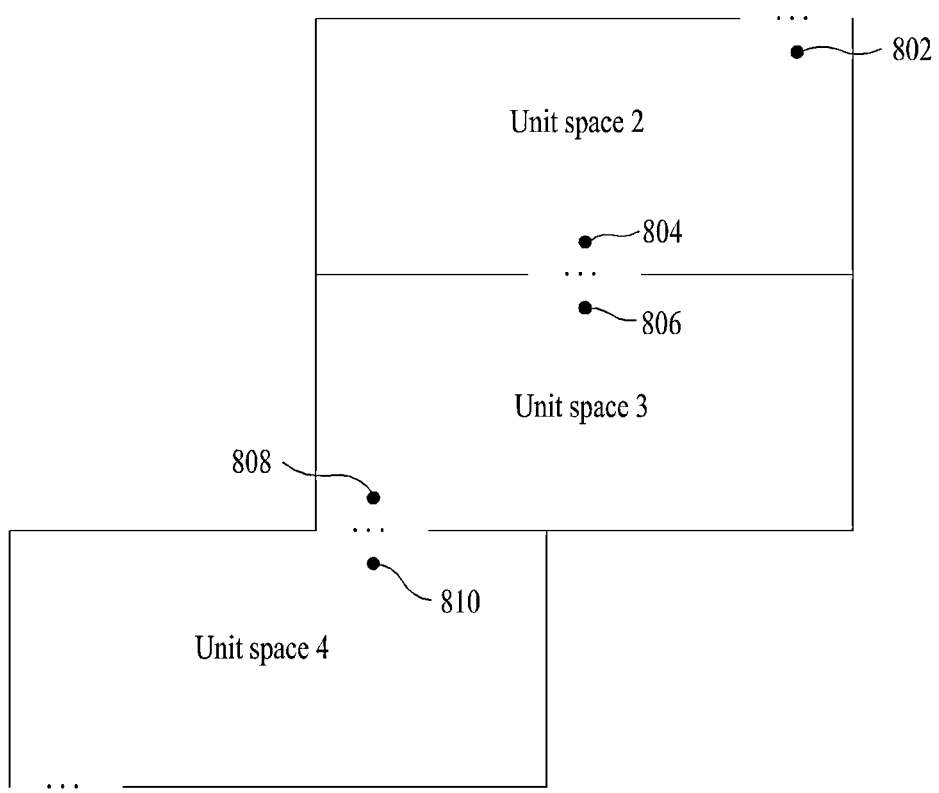
FIG. 8 illustrates a method of determining an entry/exit status in a unit space based on a desired (or alternatively, preset) node according to an example embodiment.

In this regard, FIG. 8 illustrates a method of determining an entry and exit status in a unit space based on a desired (or alternatively, preset) node according to an example.

In the illustrated example, if the user terminal 100 passes through a node 802 corresponding to an entrance point of unit space 2, the user terminal 100 may be determined to have entered unit space 2, and if the user terminal 100 passes through a node 804 corresponding to an exit point of unit space 2, the user terminal 100 may be determined to have exited from unit space 2. If the user terminal 100 passes through a node 806 corresponding to an entrance point of unit space 3, the user terminal 100 may be determined to have entered unit space 3, and if the user terminal 100 passes through a node 808 corresponding to an exit point of unit space 3, the user terminal 100 may be determined to have exited from unit space 3. If the user terminal 100 passes through a node 810 corresponding to an entrance point of unit space 4, the user terminal 100 may be determined to have entered unit space 4.

The node 802, 806, 810 corresponding to the entrance point may be provided on an entrance side of a corresponding unit space and the node 804, 808 corresponding to the exit point may be provided on an exit side of a corresponding unit space. If a unit space includes a plurality of entrances or exits, a plurality of nodes corresponding to an entrance point or a plurality of nodes corresponding to an exit point may be provided. Each node may be associated with 2D coordinates or 3D coordinates and the coordinates may be included in geodata of a corresponding unit space.

When a unit space is not an open space but a space with entrance and/or exit, entry/exit of the user terminal 100 into/from the unit space may be determined depending on whether the user terminal 100 passes through the entrance point and/or the exit point, which may increase accuracy of decision.

Description related to a positioning method of the user terminal 100 and description related to a method of determining whether the user terminal 100 is present in the unit space may be similarly applied to a method of determining whether the user terminal 100 has passed through a node and thus, repeated description is omitted.

In operation 420, as the user terminal 100 is determined to have left the unit space, the user terminal 100 or the server 200 may change display of the content 30 through the AR view 10. Alternatively/additionally, the user terminal 100 or the server 200 may change settings of an application installed on the user terminal 100.

For example, when the user terminal 100 is determined to have left the second unit space and have moved to another unit space, a third unit space, among a plurality of unit spaces defined in a service space, the user terminal 100 or the server 200 may stop augmenting and displaying content associated with the second unit space in the image of the AR view 10 and may augment and display at least one another content associated with the third unit space in the image of the AR view 10. That is, as movement of the user terminal 100 to the other unit space is verified, the augmented content displayed through the AR view 10 may be dynamically updated with content associated with the corresponding other unit space. Accordingly, content associated with the unit space that the user terminal 100 has already left or content unassociated with the unit space that the user terminal 100 has entered may not be augmented in the image of the AR view 10.

As described above, in an example embodiment, entry/exit of the user terminal 100 into/from a unit space may be verified in consideration of a location that is identified in real time according to a movement of the user terminal 100. Therefore, display deactivation of content associated with a unit space from which the user terminal 100 has exited and display activation of content associated with a unit space that the user terminal 100 has entered may be performed in real time. For example, in a case in which the user terminal 100 tours a museum that is a service space, even when the user terminal 100 moves between exhibition halls corresponding to unit spaces, a transition for displaying content associated with an exhibition hall that the user terminal 100 has entered may be performed in real time and dynamically.

Alternatively/additionally, as the movement of the user terminal 100 to the other unit space is identified, settings of an application installed on the user terminal 100 may be appropriately changed according to an attribute of the other unit space.

Description related to technical features made above with reference to FIGS. 1 to 3, FIGS. 6, 7, and 13 may apply as is to FIGS. 4 and 8 and thus, repeated description is omitted.

Figure 5:
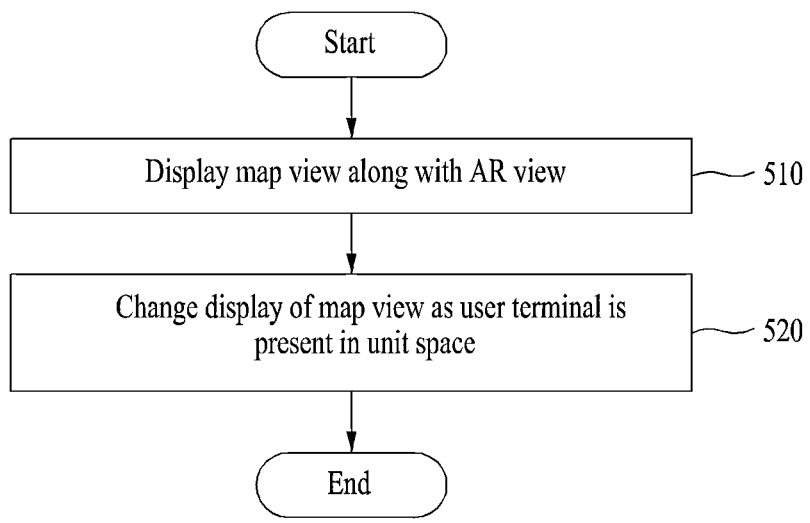
FIG. 5 is a flowchart illustrating a method of displaying a map view according to an example embodiment.

FIG. 5 is a flowchart illustrating a method of displaying a map view according to an example.

In operation 510, the user terminal 100 may display the map view 20 that includes a map matching the image, along with the AR view 10. That is, the map included in the map view 20 may include a current location of the user terminal 100 and a location indicated by the image. The server 200 may control the user terminal 100 to display the map view 20.

As described above with reference to FIG. 1, the map view 20 may include the current location 50 of the user terminal 100. The map view 20 may include a 2D map or a 3D map, and may include a unit space in which the user terminal 100 moves, content provided to the user terminal 100, or an object to which the content is mapped.

In operation 520, when displaying the map view 20, the user terminal 100 may display an area of a map corresponding to a unit space in which the user terminal 100 is determined to be present to be visually distinguished from a remaining area.

As illustrated in FIG. 1, the unit space in which the user terminal 100 is present may be visually distinguished by three-dimensionally displaying an area corresponding to the unit space in which the user terminal 100 is present and by two-dimensionally displaying the remaining area in the map view 20. For example, the user terminal 100 may three-dimensionally display (e.g., wall portion) boundary between the area corresponding to the unit space and the remaining area in the map view 20 and may highlight the area corresponding to the unit space compared to the remaining area, such that the unit space in which the user terminal 100 is present may be visually identified. Highlighting may represent displaying the area corresponding to the unit space in color different from that of the remaining area.

Also, the user terminal 100 may display the effect of three-dimensionally displaying the area corresponding to the unit space in which the user terminal 100 is present as an animation. That is, when the user terminal 100 enters the unit space, the user terminal 100 may play back the animation of changing the boundary between the area corresponding to the unit space and the remaining area, which is two-dimensionally displayed, in the map view 20. An operation of highlighting the area corresponding to the unit space may also be performed simultaneously with playback of the animation. Therefore, entry of the user terminal 100 into a specific unit space may be intuitively identified even through the map view 20.

Meanwhile, depending on example embodiments, the user terminal 100 may display the map view 20 separate from the AR view 10, that is, on a separate screen.

Figure 11:
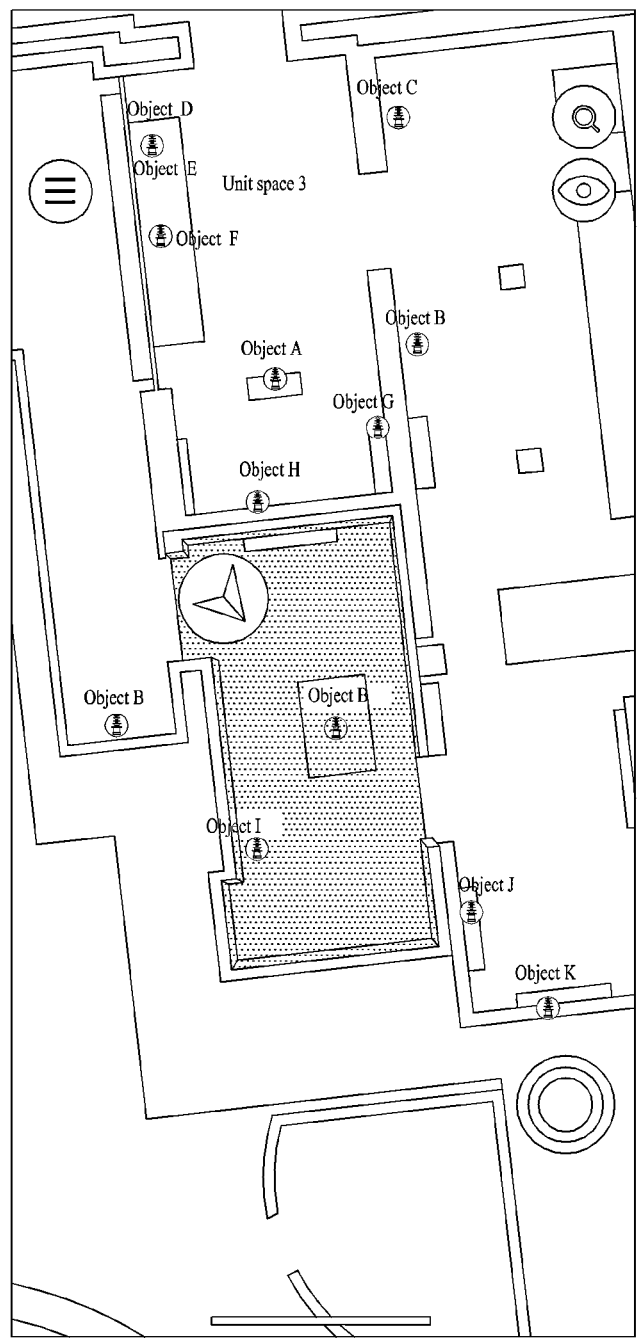
FIG. 11 illustrates a method of displaying a map for a space in which a user terminal moves according to an example embodiment.

In this regard, FIG. 11 illustrates a method of displaying a map for a space in which a user terminal moves according to an example.

A map screen shown in FIG. 11 may be the map view 20 displayed separate from the AR view 10. As illustrated, even in a map view shown in FIG. 11, an area corresponding to a unit space in which the user terminal 100 is determined to be present may be displayed to be distinguished from a remaining area. Likewise, even in the map view of FIG. 11, the user terminal 100 may three-dimensionally display boundary (e.g., wall portion) between the area corresponding to the unit space and the remaining area and may highlight the area corresponding to the unit space compared to the remaining area, such that the unit space in which the user terminal 100 is present is visually distinguished. The aforementioned effect of displaying the effect of three-dimensionally displaying the area corresponding to the unit space in which the user terminal 100 is present as the animation may also be applied as is in the example of FIG. 11.

Meanwhile, depending on example embodiments, the map view 20 may be configured to not display content or an object within a unit space other than the unit space in which the user terminal 100 has entered.

As illustrated, an area corresponding to a unit space of the map of the map view 20 may be labelled with a name (representative name) or an identifier of the corresponding unit space. The name (or representative name) or identifier of the labeled unit space may be displayed as augmented content on the user terminal 100 upon entry into the unit space or before entry into the unit space.

Hereinafter, a method of displaying augmented content through the map view 20 is described with reference to FIG. 12.

Figure 12A:
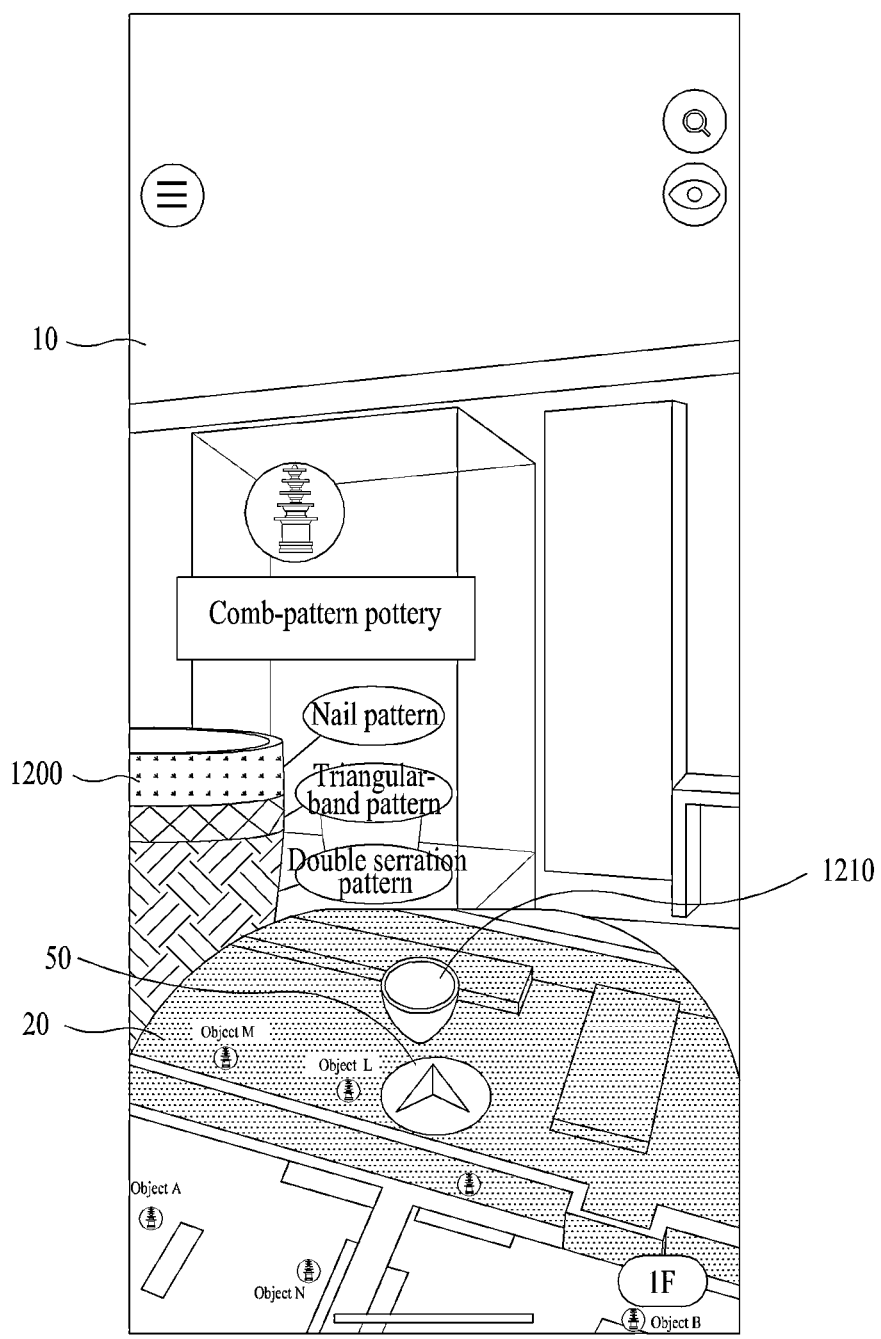
FIG. 12A illustrates a method of providing an AR view and a map view in a user terminal as the user terminal enters a unit space according to an example embodiment.
Figure 12B:
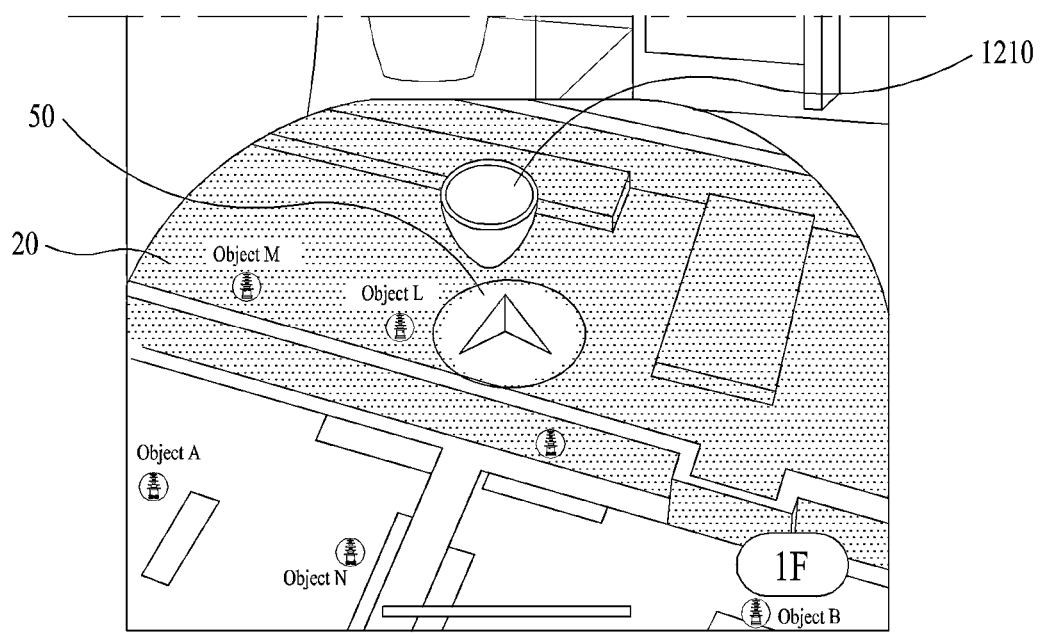
FIG. 12B illustrates a map view on a screen of the user terminal of FIG. 12A in more detail.

FIGS. 12A illustrates a method of providing an AR view and a map view in a user terminal as the user terminal enters a unit space according to an example. FIG. 12B illustrates a map view on a screen of a user terminal of FIG. 12A in more detail.

As illustrated in FIG. 12A, when the user terminal 100 enters the unit space or when the user terminal 100 approaches an object within the unit space by a desired (or alternatively, predetermined) distance or more after entering the unit space, content 1200 mapped to the object may be augmented and displayed in the image of the AR view 10. The content 1200 may correspond to the aforementioned content 30.

As in the illustrated example, when the object is comb-pattern pottery, the content 1200 mapped to the object may include a text and a 3D image as content for explaining the comb-pattern pottery. The 3D image may be a shape corresponding to the object. The text may include information for explaining details of the object. For example, the text may include a text for explaining a pattern type of the comb-pattern pottery.

Meanwhile, a plurality of contents may be mapped to the object. For example, the object that is comb-pattern pottery may be mapped with first content including an icon representing a name of the object ('comb-pattern pottery') and a type or a kind of the object and second content such as the content 1200 for the object.

When the user terminal 100 enters the unit space, the first content may be initially augmented and displayed in the image of the AR view 10. When the user terminal 100 identifies the first content, moves towards the object, and approaches the object by a desired (or alternatively, certain or predetermined) distance or more, the content 1200 that is the second content may be augmented and displayed in the image of the AR view 10.

In providing the augmented content in an example embodiment, a method of providing augmented content based on typical rendering range may be additionally combined and used in addition to a method of providing augmented content based on semantic range.

This is further described below with reference to FIG. 9.

Meanwhile, as described above, the unit space in which the user terminal 100 is present may be displayed to be visually distinguished in the map view 20. Meanwhile, content 1210 corresponding to the content 1200 may be displayed in the map view 20. The content 1210 may be displayed in the map view 20 at a point in time at which the content 1200 is displayed through the AR view 10. Through this, the user may intuitively identify a display location of the content 1200 even through the content 1210 displayed through the map view 20 as well as the AR view 10. The animation effect may be applied when the content 1210 is displayed in the map view 20.

As described above, in an example embodiment, the content 1200 and the content 1210 for the object within the unit space in which the user terminal 100 has entered may be provided to the user terminal 100 in an effective manner through the AR view 10 and the map view 20.

Description related to technical features made above with reference to FIGS. 1 to 4, FIGS. 6 to 8, and FIG. 13 may apply as is to FIGS. 5, 11, and 12 and thus, repeated description is omitted.

Figure 9:
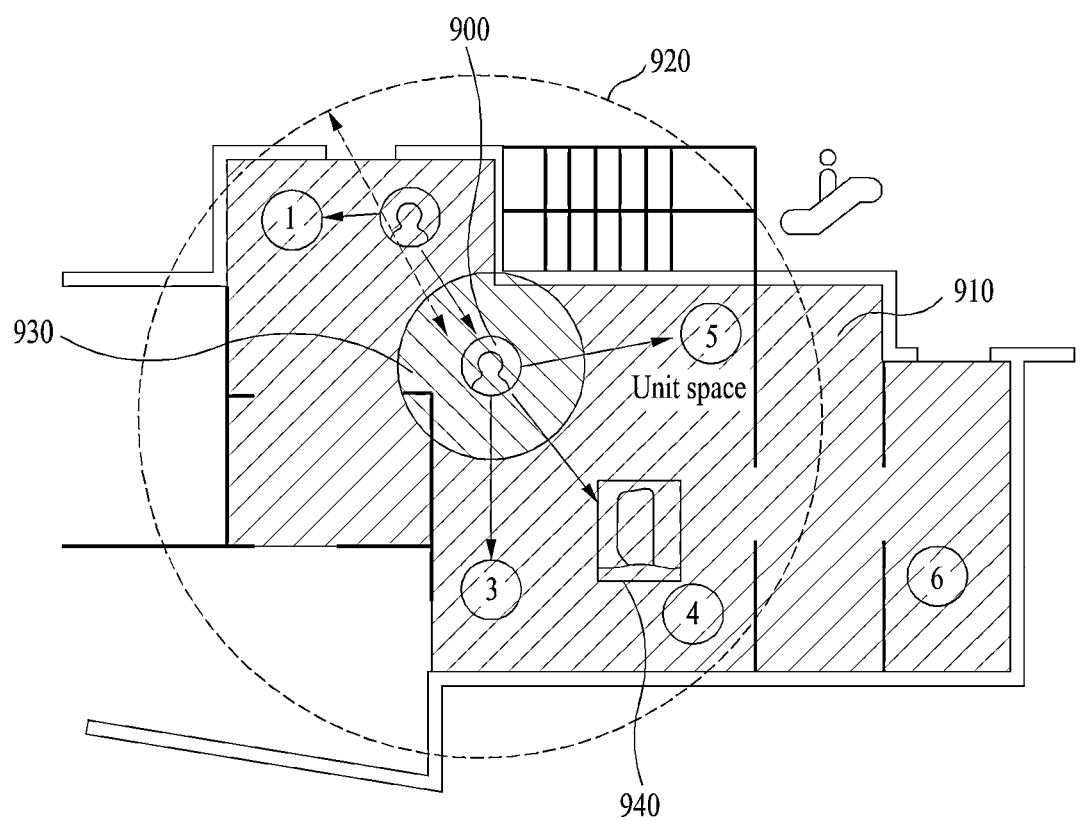
FIG. 9 illustrates a method of providing augmented content according to a movement of a user terminal within a unit space according to an example embodiment.

FIG. 9 illustrates a method of providing augmented content according to a movement of a user terminal within a unit space according to an example.

In providing augmented content, a method additionally combined and used with a method of providing the augmented content based on typical rendering range in addition to a method of providing the augmented content based on semantic range is further described with reference to FIG. 9.

A unit space 910 in which the user terminal 100 is present, that is, in which the user terminal 100 has entered may be associated with a plurality of contents. For example, a unit space may include a plurality of objects to which a plurality of contents are mapped. Also, as described above, a plurality of contents may be mapped to a single object.

When the user terminal 100 is determined to be present in the unit space 910, the user terminal 100 may augment and display, in the image of the AR view 10, content mapped to an object present within a desired (or alternatively, certain or predetermined) distance from the location of the user terminal 100 or within a desired (or alternatively, certain or predetermined) radius from the location of the user terminal 100 among the plurality of contents based on the location of the user terminal 100. For example, although the user terminal 100 enters the unit space 910, all contents associated with the unit space 910 may not be augmented and displayed and, instead, only some contents may be displayed in the image of the AR view 10. When the user terminal 100 approaches an object to which the content is mapped, the user terminal 100 may augment and display the corresponding content in the image of the AR view 10.

As described above, in an example embodiment, contents filtered based on the semantic range may be filtered once more based on the typical rendering range and provided to the user terminal 100. Accordingly, in an example embodiment, the user may not be provided with content associated with a unit space in which the user is not present and, at the same time, may not be provided with content far away from a current location even in a unit space in which the user is present or content unrelated to an object the user is currently viewing.

As in the illustrated example, within the unit space 910, a user 900 may move toward objects ① to ⑥ present in the unit space 910. A range 920 may represent the user's movement range. A range 930 may represent a radius within which content is output. The range 930 may be a distance and may be differently set depending on each of contents mapped to the objects ① to ⑥. Also, the range 930 may be differently set according to an attribute or a feature of the unit space 910. For example, the user 900 may move toward the object ④ within the unit space 910 and when the object ④ comes within the range 930, content 940 may be displayed in the AR view 10 of the user terminal 110. The content 940 may not be displayed when the user terminal 100 enters the unit space 910 and may be displayed when the user terminal 100 approaches the object ④.

A plurality of contents associated with the unit space 910 may be hierarchical. For example, when the user terminal 100 enters the unit space 910 or when the user terminal 100 approaches the unit space 910 or a node corresponding to an entrance point by a desired (or alternatively, certain or predetermined) radius or a desired (or alternatively, certain or predetermined) distance or more, content (top layer content) representing a name (representative name) or an identifier of the unit space 910 may be initially displayed in the AR view 10 of the user terminal 100. Meanwhile, when the user terminal 100 enters the unit space 910, content (top layer content) including an icon representing a name of the object and a type or a kind of the object, such as the first content described above with reference to FIG. 12, may be displayed. When the user terminal 100 identifies the first content, moves toward the object, and approaches the object by a desired (or alternatively, certain or predetermined) distance or more, second content (lower layer content), such as the aforementioned content 1200, may be augmented and displayed in the image of the AR view 10.

As described above, in an example embodiment, hierarchical augmented content provision that considers the typical rendering range may be performed in addition to augmented content provision using the semantic range. Therefore, the user may receive only meaningful content depending on a distance from an object within a unit space.

Description related to technical features made above with reference to FIGS. 1 to 8 and FIGS. 11 to 13 may apply as is to FIG. 9 and thus, repeated description is omitted.

Figure 10:
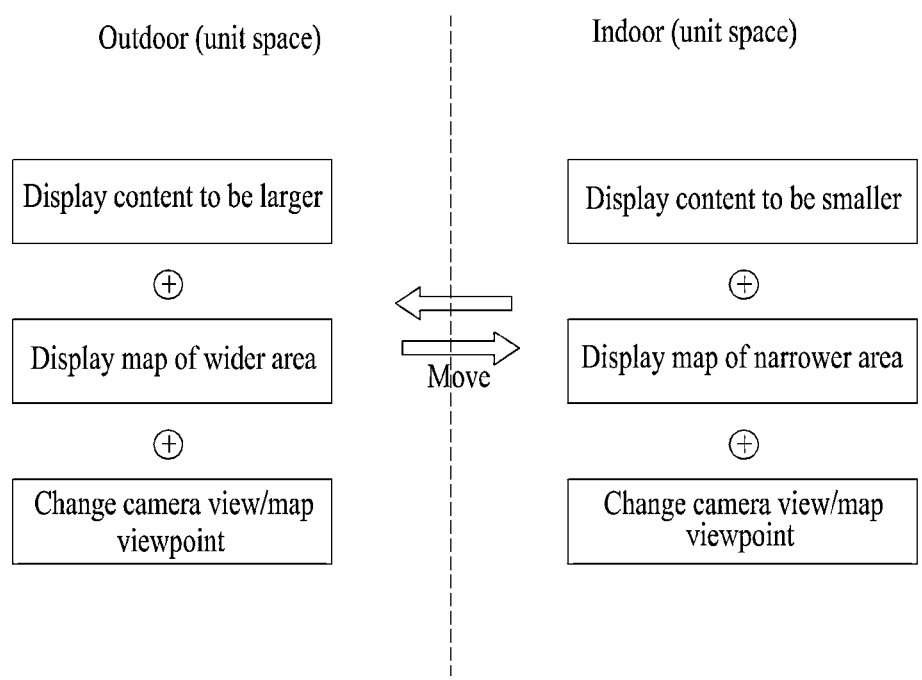
FIG. 10 illustrates a method of changing settings of an application installed in a user terminal based on an attribute of a unit space according to an example embodiment.

FIG. 10 illustrates a method of changing settings of an application installed in a user terminal based on an attribute of a unit space according to an example.

Hereinafter, a method of changing settings of an application installed on the user terminal 100 as the user terminal 100 is present in a unit space is further described with reference to FIG. 10.

As described above, as the user terminal 100 is present in the unit space, settings of an application corresponding to at least one of a display setting change of the content 30 augmented and displayed in the image, a display setting change of a user interface associated with the AR view 10, or a display setting change of a map (e.g., map of the map view 20) associated with the AR view 10 may be changed. The display setting change of the user interface may refer to changing a size of a button included in the user interface. Also, the changed settings of the application may be an angle, a distance, or an effect of a camera that provides the AR view 10, or changing a viewpoint or a viewpoint angle of the map view 20.

The settings of the application may be changed differently depending on an attribute of the unit space in which the user terminal 100 is present. For example, the settings of the application may be changed differently depending on whether the user terminal 100 is present in an indoor space or an outdoor space.

For example, when the unit space in which the user terminal 100 is determined to be present is the outdoor space, the user terminal 100 or the server 200 may change the settings of the application such that the content augmented in the image of the AR view 10 is displayed to be relatively large, and a scale of the map of the map view 20 is relatively reduced and thereby displayed. Therefore, the user terminal 100 may display the augmented content to be relatively large in the outdoor space and may display a relatively large area of the space on the map of the map view 20. Also, the user terminal 100 may appropriately change a camera angle, distance, or effect of the AR view 10 to be suitable for outdoor shooting, or may change a map viewpoint (e.g., change to a 3D map display viewpoint).

Also, when the unit space in which the user terminal 100 is determined to be present is the indoor space, the user terminal 100 or the server 200 may change the settings of the application such that the content augmented in the image of the AR view 10 is displayed to be relatively small and a scale of the map of the map view 20 is relatively enlarged and thereby displayed. Therefore, the user terminal 100 may display the augmented content to be relatively small in the indoor space and may display a relatively small area of the space in more detail on the map of the map view 20. Also, the user terminal 100 may appropriately change a camera angle, distance, or effect of the AR view 10 to be suitable for indoor shooting (e.g., further reducing an aperture value), or may change a map viewpoint (e.g., change to a 2D map display viewpoint).

As described above, in an example embodiment, whether the user terminal 100 is present in the indoor space or the outdoor space may be verified by considering a location identified in real time according to a movement of the user terminal 100, and accordingly, settings of the application may be changed in real time and dynamically. The user may have an improved or optimized experience according to an attribute of a space in which the user is present.

Meanwhile, the aforementioned attribute of the unit space is not limited to representing whether the unit space is indoors or outdoors and may represent various features related to the unit space or a type of the unit space. For example, when the unit space is an exhibition hall, the user terminal 100 may be controlled to change settings of the application according to requirements or some factors desired by the corresponding exhibition hall (i.e., camera settings required by the exhibition hall).

Description related to technical features made above with reference to FIGS. 1 to 9 and FIGS. 11 to 13 may apply as is to FIG. 10 and thus, repeated description is omitted.

A service of providing augmented content to the user terminal 100 of an example embodiment may be a metaverse service using location-based AR using 3D mapping/digital twin. Through the service of the example embodiment, a space in which the user is actually present may be recognized by identifying a location of the user terminal 100, and content linked to a specific location of the corresponding space may be augmented through the AR view 10. Information, entertainment, and even social interaction between users may be provided through the augmented content. Thus, a virtual meta layer may be added in the space that is a real world.

Through the example embodiment, complexity of the user interface by too much contents augmented through the AR view 10, an increase in cognitive load of the user, and an increase in load of the user terminal 100 may be resolved.

Some example embodiments may set "unit space" for a complex space configured by integrating/connecting a plurality of spaces and may provide meaningful content in the corresponding "unit space" to the user upon entry into the "unit space."

For example, in providing a service in a complex space with a plurality of spaces, that is, exhibition halls divided by era or theme, such as a museum, content corresponding to an exhibition hall that the user currently enters may be appropriately provided to the user terminal 100 of the user. Here, content of another exhibition hall beyond a partition (wall) may not be provided to the user terminal 100.

Meanwhile, even when the user walks in the outdoor space, a specific portion of the indoor space and a specific portion of the outdoor space may be predefined as unit spaces and accordingly, such that only meaningful content is provided to the user terminal 100 in providing the service in the complex space in which the indoor space and the outdoor space are present, in addition to the outdoor space.

This may be achieved by using semantic rendering range that defines, as a unit space, a service target space having a semantic meaning unit and thereby controls augmentation of content rather than rendering range that controls augmentation of content simply based on a distance or a radius from the user.

The apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular. However, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

Any functional blocks shown in the figures and described above may be implemented in processing circuitry such as hardware including logic circuits, a hardware/software combination such as a processor executing software, or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The methods according to the above-described example embodiments may be configured in a form of program instructions performed through various computer devices and recorded in computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes, optical media such as CD-ROM and DVDs, magneto-optical media such as floptical disks, and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. An augmented content providing method performed by a computer system that is a server or a user terminal, the augmented content providing method comprising:
  determining whether the user terminal is present in a preset unit space based on a location of the user terminal; and
  in response that the user terminal is determined to be present in the unit space, augmenting and displaying at least one content associated with the unit space in an image, through an augmented reality (AR) view that includes the image captured by a camera of the user terminal, wherein
  the unit space is predefined as a layer on a map for a space corresponding to at least a portion of the space in which the user terminal moves, independently of the location of the user terminal or a distance from the user terminal,
  the unit space corresponds to a service target area that provides a service including the content within the space,
  the content is associated with the layer and is mapped to at least one object within the unit space,
  at least a portion of the unit space overlaps another unit space preset for the space, and
  the another unit space is another portion of the space and is predefined as another layer on the map, independently of the location of the user terminal or the distance from the user terminal.

2. The augmented content providing method of claim 1, wherein the unit space is predefined by a plurality of layers having a hierarchical relationship with each other, and
  each of the plurality of layers defines a sub-unit space having a hierarchical relationship therewith.

3. The augmented content providing method of claim 2, wherein sub-unit spaces defined by the plurality of layers includes
  a first sub-unit space and a second sub-unit space at least partially included in the first sub-unit space.

4. The augmented content providing method of claim 3, wherein the second sub-unit space is a sub-unit space of the first sub-unit space, and
  the displaying comprises, in response that the user terminal is determined to be present in the second sub-unit space, augmenting and displaying at least one content associated with the second sub-unit space and at least one content associated with the first sub-unit space in the image.

5. The augmented content providing method of claim 1, wherein the unit space is predefined as a three-dimensional (3D) space of at least a portion within the space, and
  the determining comprises determining whether the user terminal is present in the unit space that is the 3D space based on the location of the user terminal including a height of the user terminal.

6. The augmented content providing method of claim 1, further comprising:
  in response that the user terminal is determined to be present in the unit space, changing settings of an application installed in the user terminal to display the AR view,
  wherein the settings of the application include at least one of a display setting change of the content, a display setting change of a user interface associated with the AR view, or a display setting change of a map associated with the AR view.

7. The augmented content providing method of claim 6, wherein the changing of the settings of the application comprises:
  when the unit space in which the user terminal is determined to be present is an outdoor space, changing the settings of the application such that the content is displayed to be relatively large and a scale of the map is relatively reduced and thereby displayed, and
  when the unit space in which the user terminal is determined to be present is an indoor space, changing the settings of the application such that the content is displayed to be relatively small and a scale of the map is relatively enlarged and thereby displayed.

8. The augmented content providing method of claim 1, wherein the unit space is associated with a plurality of contents, and
  the displaying comprises, when the user terminal is determined to be present in the unit space, augmenting and displaying, in the image, content mapped to an object present within a predetermined distance from the location of the user terminal or a predetermined radius from the location of the user terminal among the plurality of contents based on the location of the user terminal.

9. The augmented content providing method of claim 1, further comprising:
  displaying a map view that includes a map matching the image along with the AR view,
  wherein the map displayed through the map view includes the location of the user terminal, the unit space, and the content or an object to which the content is mapped.

10. The augmented content providing method of claim 9, wherein the displaying of the map view comprises displaying an area corresponding to the unit space in which the user terminal is determined to be present to be distinguished from a remaining area on the map.

11. The augmented content providing method of claim 10, wherein the displaying of the map view comprises three-dimensionally displaying boundary between the area corresponding to the unit space and the remaining area and highlighting and displaying the area corresponding to the unit space compared to the remaining area.

12. An augmented content providing method performed by a computer system that is a server or a user terminal, the augmented content providing method comprising:

determining whether the user terminal is present in a preset unit space based on a location of the user terminal; and in response that the user terminal is determined to be present in the unit space, augmenting and displaying at least one content associated with the unit space in an image, through an augmented reality (AR) view that includes the image captured by a camera of the user terminal, wherein the unit space is predefined as a layer on a map for a space corresponding to at least a portion of the space in which the user terminal moves, independently of the location of the user terminal or a distance from the user terminal, the unit space corresponds to a service target area that provides a service including the content within the space, the content is associated with the layer and is mapped to at least one object within the unit space, a plurality of unit spaces including the unit space is defined in a space in which the user terminal moves, and the displaying comprises augmenting and displaying, in the image, at least one content associated with the unit space in which the user terminal is determined to be present, without augmenting and displaying, in the image, content associated with another unit space adjacent to the unit space, content associated with another unit space present within a predetermined radius from the location of the user terminal, or content associated with an object outside the unit space present and within the predetermined radius from the location of the user terminal.

13. The augmented content providing method of claim 12, wherein the determining comprises determining entry of the user terminal into the unit space, and the displaying further comprises, when the user terminal entered the unit space, augmenting and displaying, in the image, the content filtered as the content associated with the unit space and determining whether the user terminal has left the unit space based on the location of the user terminal.

14. The augmented content providing method of claim 13, wherein the determining of the entry comprises, when coordinates corresponding to the location of the user terminal are included in the unit space, determining that the user terminal has entered the unit space, and the determining whether the user terminal has left the unit space comprises, when the coordinates corresponding to the location of the user terminal are no longer included in the unit space, determining that the user terminal has left the unit space.

15. The augmented content providing method of claim 13, wherein the determining of the entry comprises, when the user terminal is determined to have passed through a first node predefined in association with the unit space based on the location of the user terminal, determining that the user terminal has entered the unit space, and the determining whether the user terminal has left the unit space comprises, when the user terminal is determined to have passed through a second node predefined in association with the unit space based on the location of the user terminal, determining that the user terminal has left the unit space.

16. The augmented content providing method of claim 13, further comprising:

when the user terminal is determined to have left the unit space and moved to another unit space among the plurality of unit spaces, stopping augmenting and displaying the content in the image, and augmenting and displaying at least one another content associated with the another unit space.

17. A computer program stored in a non-transitory computer-readable recording medium to execute the augmented content providing method of claim 1 on the user terminal that is the computer system.

18. A computer system that implements a user terminal or a server, the computer system comprising:

at least one processor configured to execute computer-readable instructions included in a memory, wherein the at least one processor is configured to determine whether the user terminal is present in a preset unit space based on a location of the user terminal, and in response that the user terminal is determined to be present in the unit space, augment and display at least one content associated with the unit space in an image, through an augmented reality (AR) view that includes the image captured by a camera of the user terminal, and wherein the unit space is predefined as a layer on a map for a space corresponding to at least a portion the a space in which the user terminal moves, independently of the location of the user terminal or a distance from the user terminal, the unit space corresponds to a service target area that provides a service including the content within the space, the content is associated with the layer and is mapped to at least one object within the unit space, at least a portion of the unit space overlaps another unit space preset for the space, and the another unit space is another portion of the space and is predefined as another layer on the map, independently of the location of the user terminal or the distance from the user terminal.

* * * * *